US006467575B1

(12) United States Patent
Chen

(10) Patent No.: US 6,467,575 B1
(45) Date of Patent: Oct. 22, 2002

(54) COLLAPSIBLE SPIRAL-TUBE ESCAPE WAY

(76) Inventor: Lian-Chen Chen, 4F, No. 16, St. Tzyh Cheang 7, Lin Koou Hsiang, Taipei Hsien (TW)

( * ) Notice: Subject to any disclaimer, the term of this patent is extended or adjusted under 35 U.S.C. 154(b) by 0 days.

(21) Appl. No.: 10/002,208

(22) Filed: Dec. 5, 2001

(51) Int. Cl.[7] ................................................ B62B 1/20
(52) U.S. Cl. ........................................................ 182/48
(58) Field of Search .................... 182/48, 49; 193/25 R

(56) References Cited

U.S. PATENT DOCUMENTS 4,162,717 A * 7/1979 Orii et al. ..................... 182/48
5,562,184 A * 10/1996 Yung-Ho ..................... 182/48
5,906,624 A * 5/1999 Wenstrom, Jr. ............... 112/69
6,102,762 A * 8/2000 Bell et al. ................... 114/375

* cited by examiner

*Primary Examiner*—Alvin Chin-Shue
(74) *Attorney, Agent, or Firm*—Dennison, Schultz & Dougherty

(57) ABSTRACT

A collapsible spiral-tube escape way includes a plurality of spiral-tube units supported on tube-supporting frames. In a first embodiment of the escape way, the tube-supporting frames in a standby position are elevated and collapsed to sit on a crane mounted on a roof of a building. In an emergency, the whole escape way is vertically lowered to locate in front of and connect to exits of the building, so that users may easily enter into the spiral-tube units via the exits at different floors and slide all the way down to the ground. In a second embodiment, the tube-supporting frames in the standby position are separately pivotally lifted to flatly attach to the exterior wall of the building outside the exits. In an emergency, users need only to open the exits and the tube-supporting frames automatically tilt down to a horizontal position to pull open the spiral-tube units for use.

7 Claims, 23 Drawing Sheets

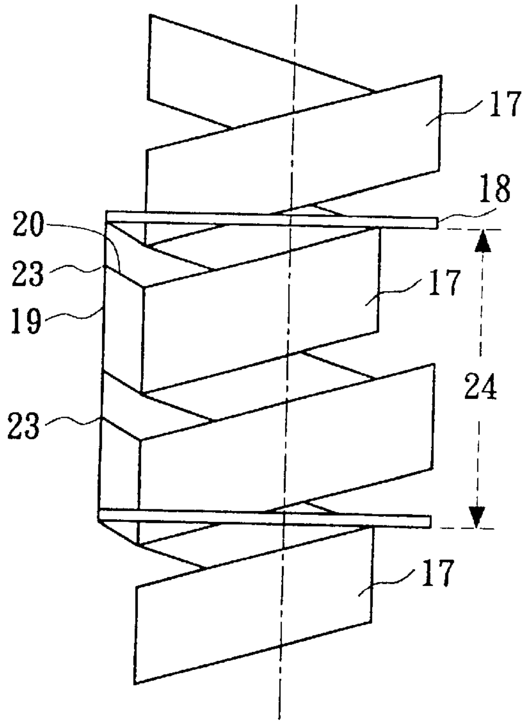
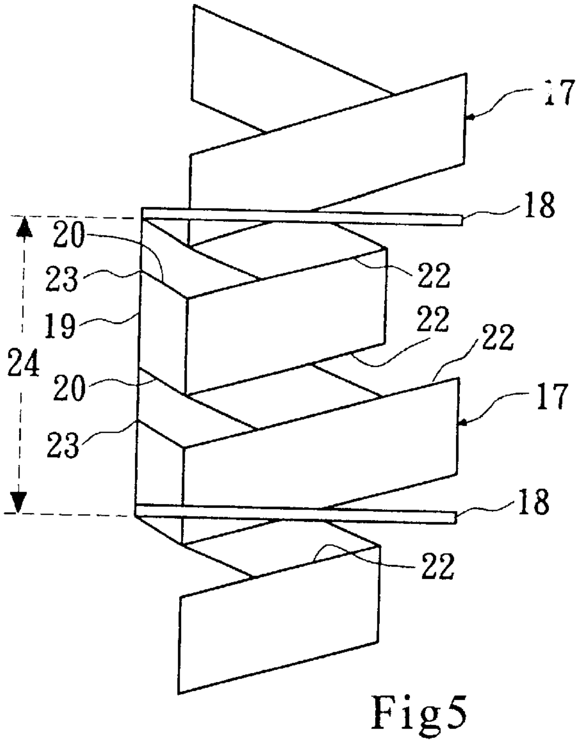
Fig5
Fig6
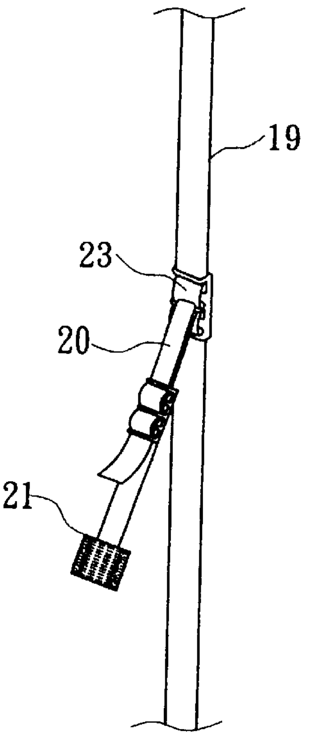
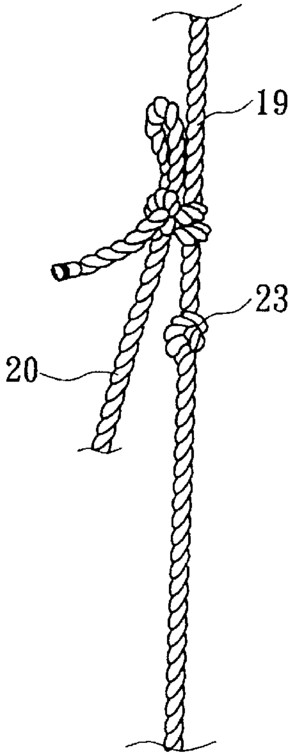
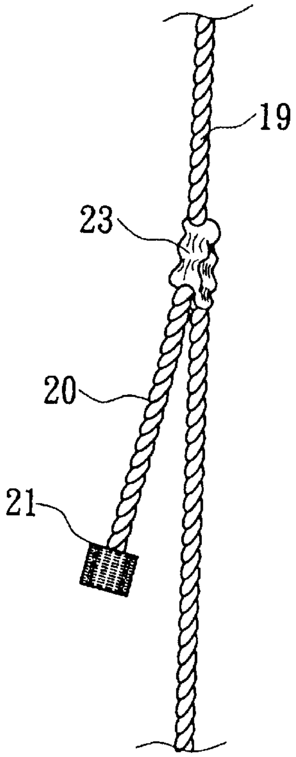
Fig5A Fig5B Fig5C

COLLAPSIBLE SPIRAL-TUBE ESCAPE WAY

BACKGROUND OF THE INVENTION

The present invention relates to a collapsible spiral-tube escape way, and more particularly to an escape way formed from a plurality of serially connected spiral-tube units separately supported on tube-supporting frames via vertical and horizontal suspension lines. The spiral-tube units are automatically extended and collapsed when the tube-supporting frames are moved into an operating and a standby position, respectively. The tube-supporting frames in the standby position are either fully elevated to stack on a roof of a building or separately pivotally lifted to flatly attach to outside of exits of the building. In an emergency, the tube-supporting frames are either vertically lowered to connect to the exits or pivotally tilted down to a horizontal position. In either case, users at different floors could easily enter into the spiral-tube escape way via the exits of the building and slide all the way down to the ground. The collapsible spiral-tube escape way of the present invention in the standby position is collapsed and does not occupy any indoor space, and is ready for use in an emergency to ensure life safety of users in the building.

The quickly increased number of high-rise buildings and the exploded population result in increased number of fires. Incomplete public facilities and escape apparatus would worsen damages in fires. Currently, there are many types of escape apparatus for use in fires, such as fixed escape ladders, lowering ropes, fire baskets, rescue bags, vertical-type conveyors, spiral ladders, ladder trucks, etc. All these conventional escape apparatus have their respective drawbacks. For example, the conventional escape ladders do not enable users to quickly run away from the site on fire and panic people tend to jam the ladders, the conventional lowering ropes are not convenient for carry and could be used by only one person each time, the fire baskets take time to reciprocate between the fire site in a building and the ground, the rescue bags are useless in the case of fires occurred at higher floors, the injured or patients on the vertical conveyors are subject to the danger of falling to the ground, the fixed spiral ladders occupy too much room and are only suitable for buildings having sufficient space, and the ladder trucks are not sufficiently mobile for use. It is therefore tried by the inventor to develop an improved collapsible spiral-tube escape way to eliminate the drawbacks existing in the currently available escape apparatus.

SUMMARY OF THE INVENTION

A primary object of the present invention is to provide a collapsible spiral-tube escape way formed from a plurality of serially connected spiral-tube units separately supported on tube-supporting frames via vertical and horizontal suspension lines. The spiral-tube units are automatically extended and collapsed when the tube-supporting frames are moved into an operating and a standby position, respectively. The tube-supporting frames in the standby position are either fully elevated to stack on a roof of a building or separately pivotally lifted to flatly attach to outside of exits of the building. In an emergency, the tube-supporting frames are either vertically lowered to connect to the exits or pivotally tilted down to a horizontal position in front of the exits. In either case, users at different floors could easily enter into the spiral-tube escape supported and pulled open by the tube-supporting frames via the exits of the building and slide all the way down to the ground. The collapsible spiral-tube escape way of the present invention in the standby position is collapsed to occupy only very limited space and is ready for use in an emergency to ensure life safety of users in the building.

Another object of the present invention is to provide a collapsible spiral-tube escape way having a plurality of spiral-tube units made of fireproof and highly rigid fabrics and suspension lines made of fireproof ropes, so that the whole collapsible spiral-tube escape way is light and collapsible. All the parts and/or accessories for forming the collapsible spiral-tube escape way could be standardized and massively produced, and the whole escape way could be assembled from these standardized parts at the construction site without any limitation in its overall length. That is, the collapsible spiral-tube escape way of the present invention could be used for buildings of any height and could be very quickly and easily installed. Moreover, the spiral tube provides a closed escape way in which users would not fear when moving down from a high place.

A further object of the present invention is to provide a collapsible spiral-tube escape way that are assembled from a plurality of spiral-tube units and corresponding hardware, and could therefore be partially replaced and repaired in case of any damage to always maintain the escape way in a normal condition for use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 5 shows one spiral-tube unit of the collapsible spiral-tube escape way of the present invention is extended longer when a distance between two adjacent joints of every vertical suspension line and the spiral tube is larger;

FIG. 5A shows a first type of suspension line for the collapsible spiral-tube escape way of the present invention;

FIG. 5B shows a second type of suspension line for the collapsible spiral-tube escape way of the present invention;

FIG. 5C shows a third type of suspension line for the collapsible spiral-tube escape way of the present invention;

FIG. 6 shows one spiral-tube unit of the collapsible spiral-tube escape way of the present invention is extended shorter when a distance between two adjacent joints of every vertical suspension line and the spiral tube is smaller;

DETAILED DESCRIPTION OF THE PREFERRED EMBODIMENTS

Figure 1:
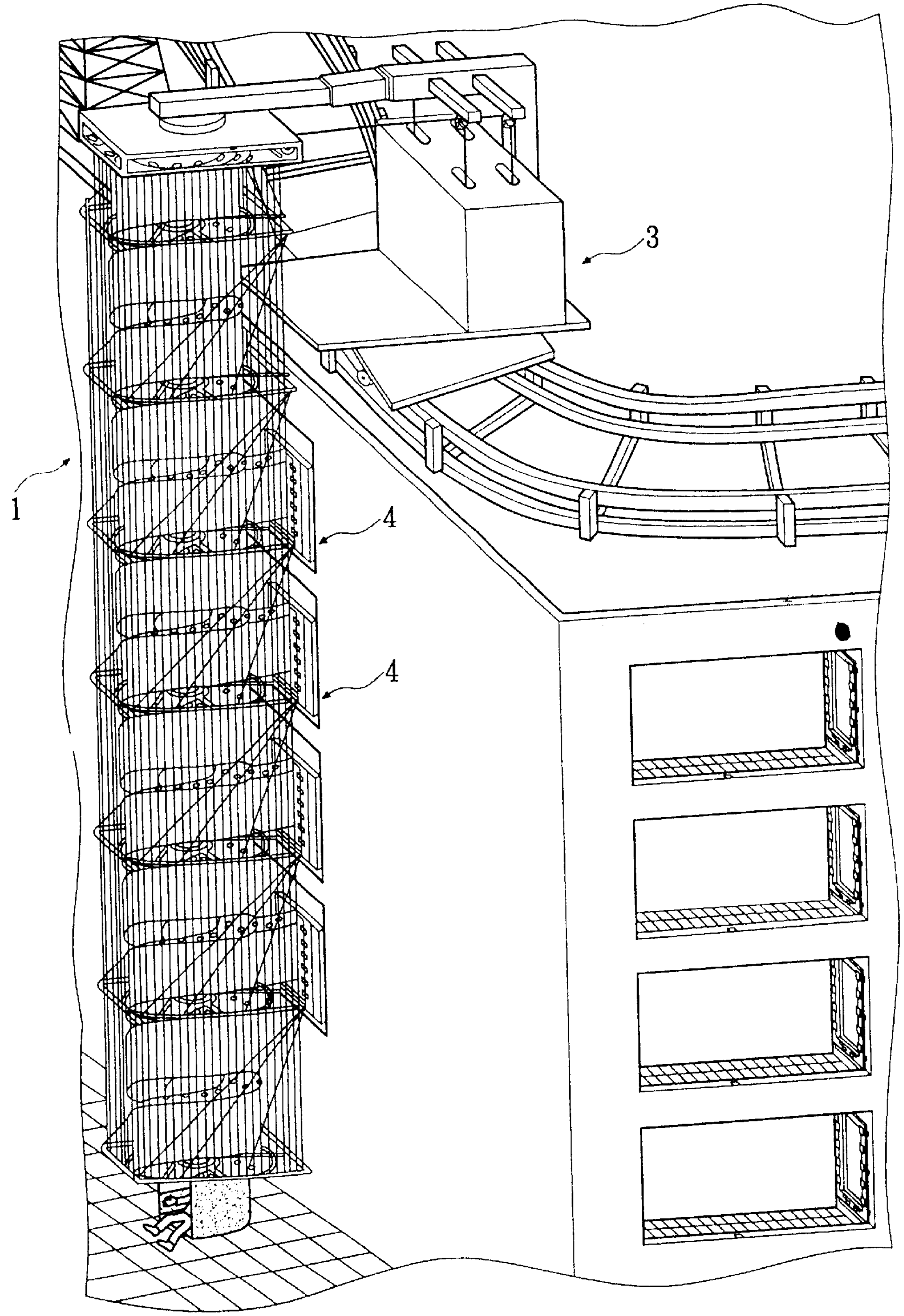
FIG. 1 shows a lowering-type collapsible spiral-tube escape way according to a first embodiment of the present invention in an extended state or operating position for use.

Please refer to FIG. 1 in which a collapsible spiral-tube escape way 1 according to a first embodiment of the present invention is shown. In this embodiment, the escape way 1 includes a plurality of serially connected spiral-tube units that may be lowered from a crane equipment 3 mounted on a roof of a building to located in front of exits 4, such as doors, windows, balconies or other types of entrances, of the building, allowing users at different floors of the building to enter into the escape way 1 at each spiral-tube unit and slide all the way down to the ground. In the following description of the present invention, the collapsible spiral-tube escape way 1 of this first embodiment will be briefly referred to as a lowering-type escape way 1.

Figure 2:
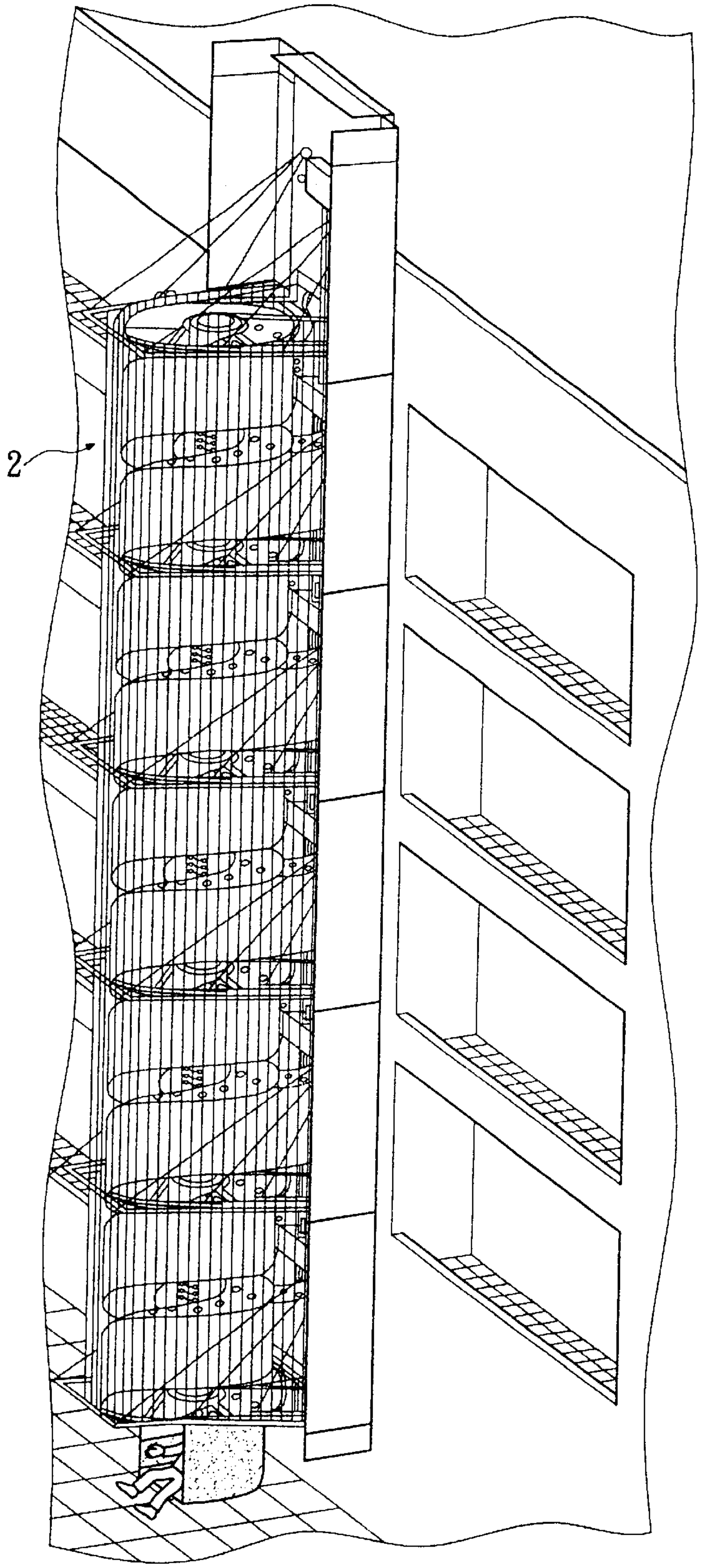
FIG. 2 shows a tilting-type collapsible spiral-tube escape way according to a second embodiment of the present invention in an operating position for use.

And, FIG. 2 shows a collapsible spiral-tube escape way 2 according to a second embodiment of the present invention. In this second embodiment, the escape way 2 includes a plurality of serially connected spiral-tube units that are separately pivotally connected at a rear end to an exterior wall of a building to correspond to a series of fire exits thereof. The spiral-tube units are normally pivotally lifted to the rear end, and users need only to open the fire exits of the building for the escape way 2 to automatically open its protection doors outside the fire exits and tilts down the spiral-tube units for users to enter into the escape way 2 and slide all the way down to the ground. In the following description of the present invention, the collapsible spiral-tube escape way 2 of this second embodiment will be briefly referred to as a tilting-type escape way 2.

Figure 3:
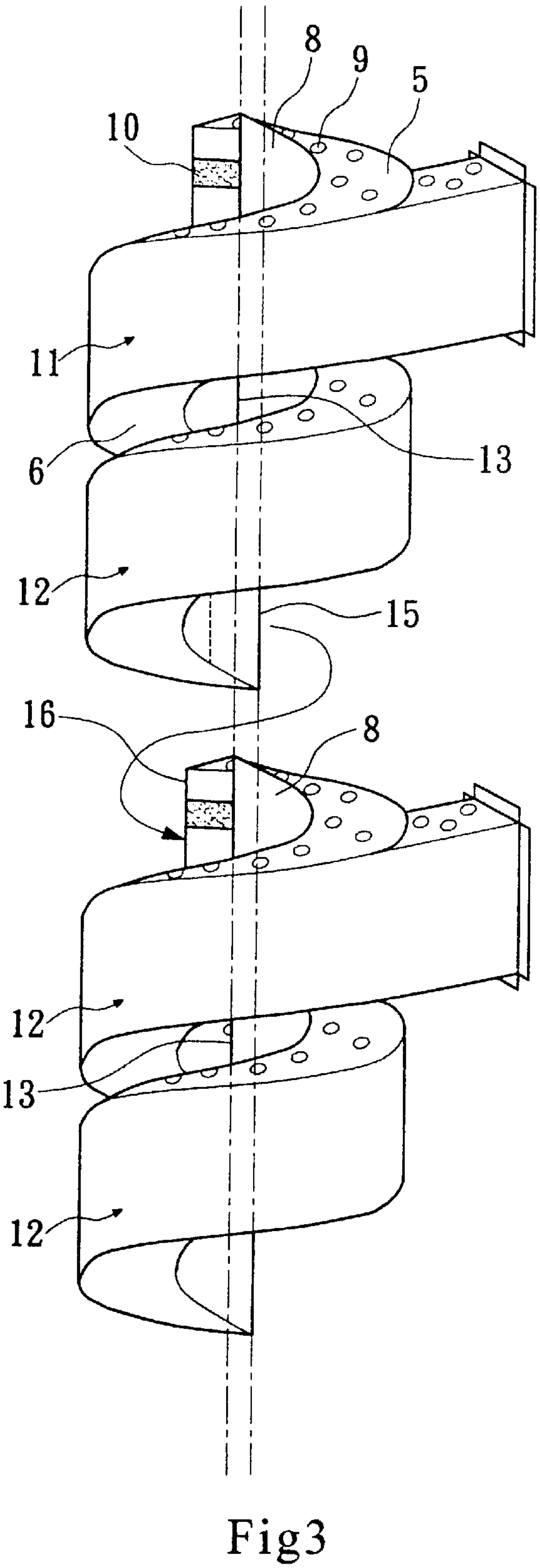
FIG. 3 is an exploded perspective view showing spiral-tube units for forming a complete spiral tube of the collapsible spiral-tube escape way of the present invention.
Figure 4:
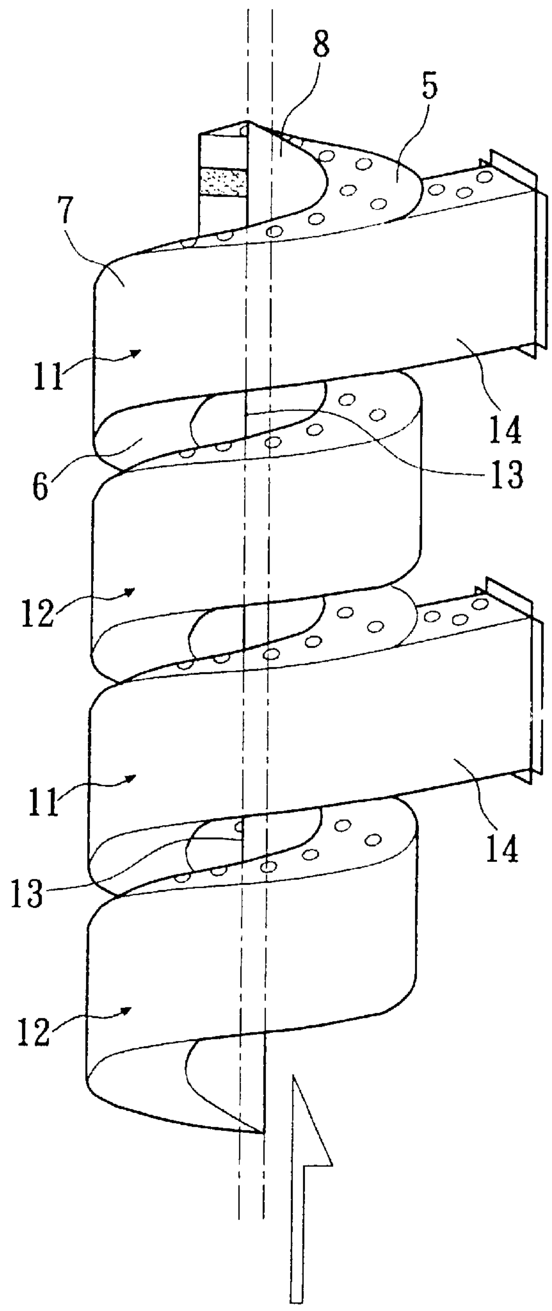
FIG. 4 shows the connection of two adjacent spiral-tube units of the collapsible spiral-tube escape way of the present invention.

As shown in FIGS. 3 and 4, the lowering-type collapsible spiral-tube escape way 1 is formed from a plurality of serially connected spiral-tube units, each of which includes, for example, two turns of spiral tube, namely, an upper and a lower turn of spiral tube 11 and 12, respectively, being sewed together at a joint 13 between them. Each turn of the spiral tube, either the upper or the lower turn 11 or 12, includes an upper panel 5, a lower panel 6, an outer panel 7, and an inner panel 8. All the four panels 5, 6, 7 and 8 are preferably made of a fireproof fabric and are connected to one another to form each turn in any acceptable manner, such as by sewing them together in a predetermined way. The upper and the lower panels 5, 6 are identical in shape, except that the upper panel 5 is provided with a plurality of vents 9. A layer of rubber material 10 may be applied over inner surfaces of the spiral-tube units (see FIG. 10) before they are sewed together. By contacting hands with the rubber material 10, a user may easily control a slide speed in the collapsible spiral-tube escape way 1. Moreover, each spiral-tube unit of the collapsible spiral-tube escape way 1 includes a slide passage 14 connected to one side of the upper turn 11 to communicate with an internal space of the escape way 1. When the spiral-tube escape way 1 turns right-handed, the slide passages 14 are connected to a left side of the upper turns 11, allowing users to directly move into the spiral-tube units via the slide passages 14 in a forward direction. Reversely, when the spiral-tube escape way 1 turns left-handed, the slide passages 14 are connected to a right side of the upper turns 11. Two adjacent spiral-tube units are connected to each other by inserting a lower end 15 of an upper unit into an upper end 16 of a lower unit and connecting the ends 15, 16 together by, for example, tying cords or buttons. In this way, unlimited number of units could be connected to form a continuous spiral tube having a desired overall length. It is understood that each spiral-tube unit is not limited to have only an upper and a lower turn 11, 12, but may include only one or more than two turns.

As can be seen in FIG. 5, the spiral tube, which is denoted by reference numeral 17, of each spiral-tube unit is connected to and supported on a tube-supporting frame 18 via a plurality of vertical suspension lines 19 and horizontal suspension lines 20. A tail end 21 of each horizontal suspension line 20 should be sewed into an outward projected seam 22 of the spiral tube 17 (see FIG. 10). The suspension lines 19, 20 may be of any form, such as belts or braided ropes, so long as they are fireproof and have sufficient rigidity. FIGS. 5A, 5B and 5C illustrate some examples of the suspension lines 19, 20.

Since the spiral tube 17 is flexible and extendable, only one specification is enough for the spiral-tube units. To connect the spiral-tube unit to each tube-supporting frame 18, first adjust supporting knots 23 on the vertical suspension lines 19 to suitable intervals 24. The interval 24 between two adjacent supporting knots 23 decides an overall height of each spiral-tube unit. When the interval 24 is larger, each spiral-tube unit has an increased overall height and gradient, as shown in FIG. 5. And, when the interval 24 is smaller, each spiral-tube unit has a reduced overall height and gradient, as shown in FIG. 6. Through adjustment of the horizontal suspension lines 20, the spiral tube 17 of the fully connected spiral-tube units would have only minor errors in their diameters that would not have any influence on the normal function of the collapsible spiral-tube escape way, either the lowering type 1 or the tilting type 2. Since the tube-supporting frames 18 have fixed dimensions, they are not affected in their operation, that is, being lowering, in the case of the lowering-type escape way 1, or tilting, in the case of the tilting-type escape way 2, to correct positions corresponding to fire exits 4, due to minor changes in the diameters of spiral tubes 17 of different spiral-tube units.

Figure 7:
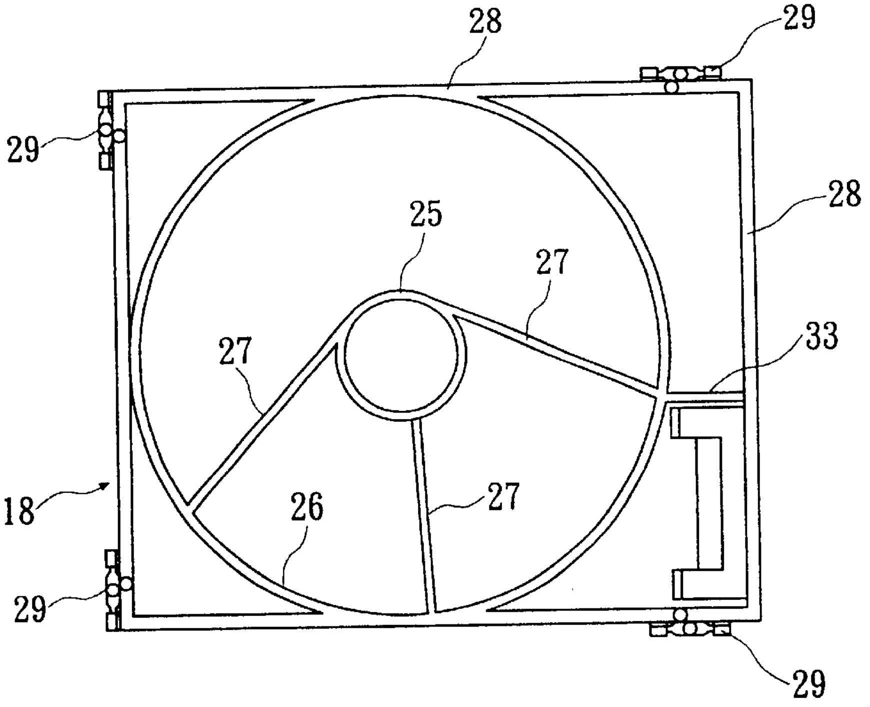
FIG. 7 is a top plan view of a tube-supporting frame for the lowering-type collapsible spiral-tube escape way, wherein a movable-exit frame is connected to each tube-supporting frame.
Figure 7A:
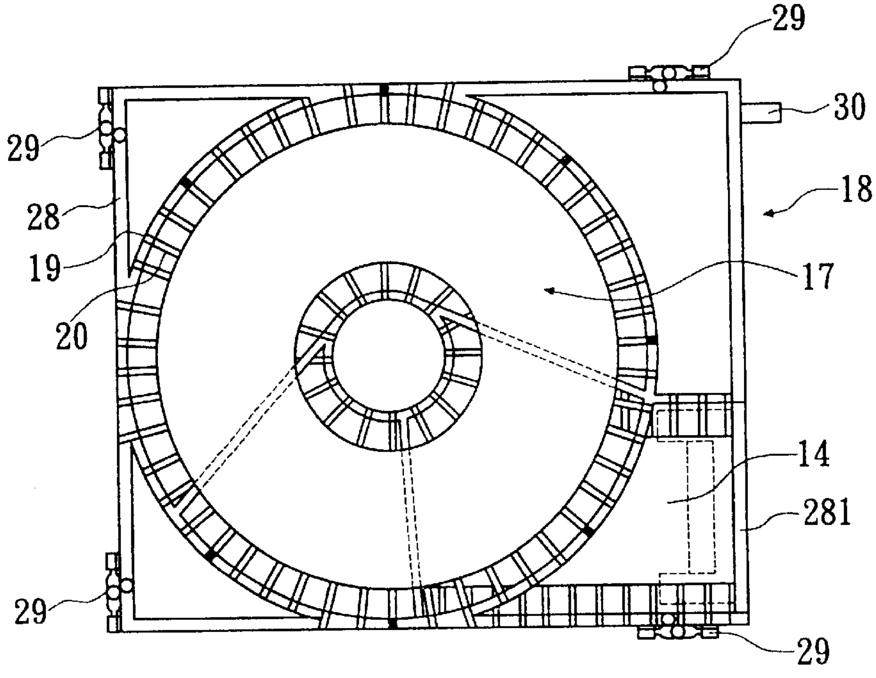
FIG. 7A is a top plan view showing the spiral tube of the lowering-type collapsible spiral-tube escape way is pulled open by suspension lines.
Figure 7B:
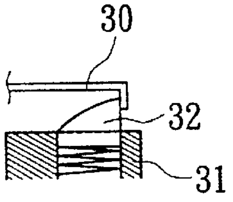
FIG. 7B is a fragmentary side view showing a holding plate provided on an outer rectangular frame of the tube-supporting frame of FIG. 7 engages with a catch mounted on a wall.
Figure 8:
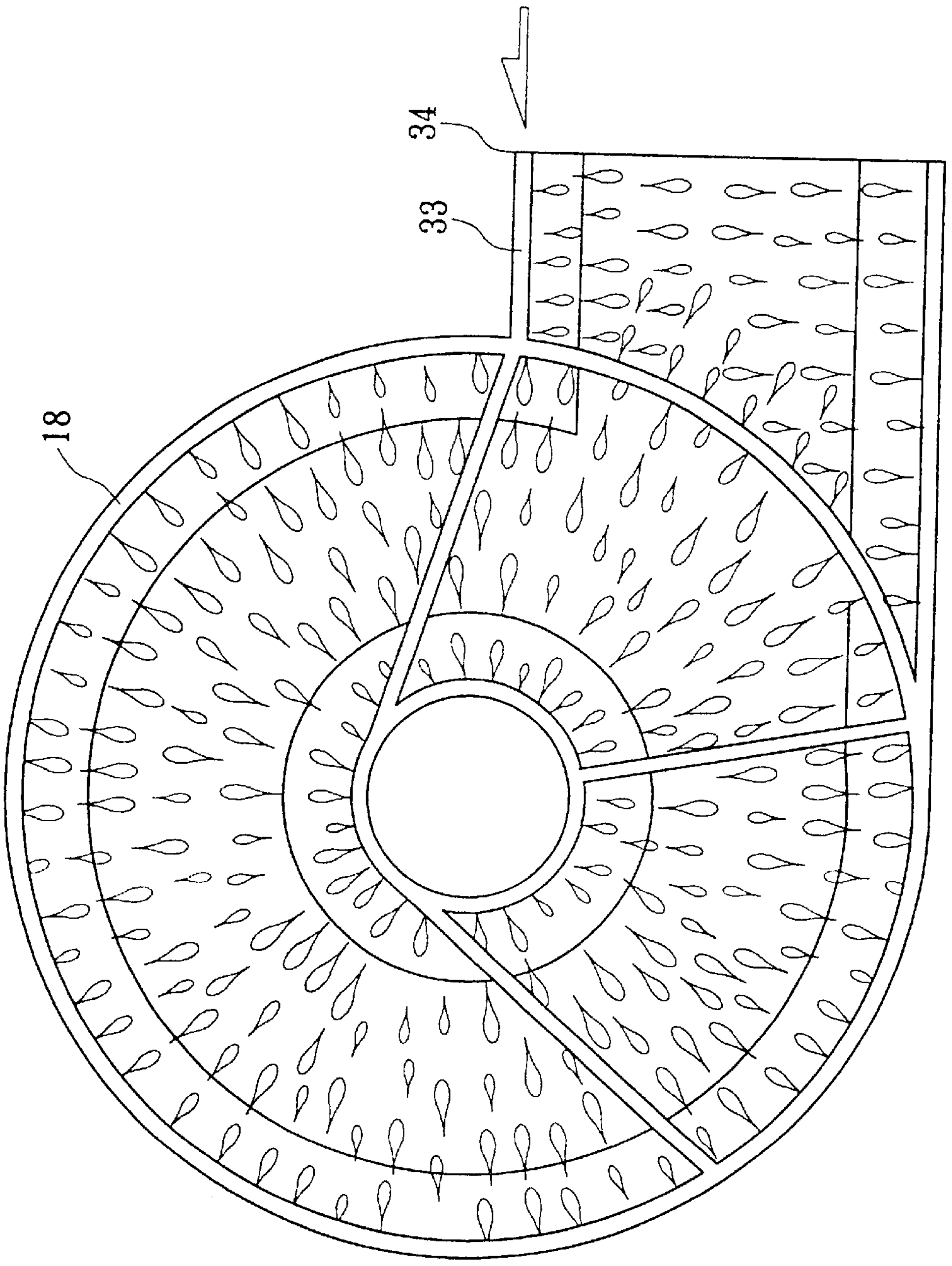
FIG. 8 shows areas covered by water sprayed from the tube-supporting frame for both lowering and tilting types of the collapsible spiral-tube escape way of the present invention.

The tube-supporting frames 18 provide the main strength for the escape way 1 to smoothly stretch into an operative position. Please refer to FIGS. 7, 7A, 7*b,* and 8. The tube-supporting frames 18 are made of rustproof and highly rigid material. Each tube-supporting frame 18 includes an inner and an outer round frame 25, 26, respectively, a set of inner-round-frame braces 27, and an outer rectangular frame 28. With the plurality of vertical and horizontal suspension lines 19, 20 that tie the entire spiral tube 17 and the slide passages 14 to the round frames 25, 26 and the rectangular frames 28 of the tube-supporting frames 18, the spiral tube 17 is radially pulled inward at an inner side and radially pulled outward at an outer side to facilitate smooth entrance of users at different floors into the spiral tube 17 via the slide passage 14 of each spiral-tube unit corresponding to each floor. A plurality of steel-cable clampers 29 are mounted on each outer rectangular frame 28 of the tube-supporting frame 18 at predetermined positions. A holding plate 30 is provided on each outer rectangular frame 28 at a predetermined position, so that the holding plate 30 firmly engages with a catch 32 mounted on an exterior wall 31 of the building after the whole escape way 1 has been lowered to position each spiral-tube unit in front of a corresponding one of the fire exits 4, ensuring that whole escape way 1 is stable and solid for use.

The tube-supporting frames 18 may also serve as water pipes for supplying water to wet the suspension lines 19, 20 and the spiral tube 17. For example, each outer rectangular frame 28 may be provided with a port at a joint 34 between it and a supporting frame 33 connected thereto for supporting the slide passage 14. The port communicates the rectangular frame 28 with the supporting frame 33 and serves as a water inlet adapted to connect to an external water source, so that water may be sprayed from spray holes provided on the tube-supporting frame 18 to wet the suspension lines.

Figure 9:
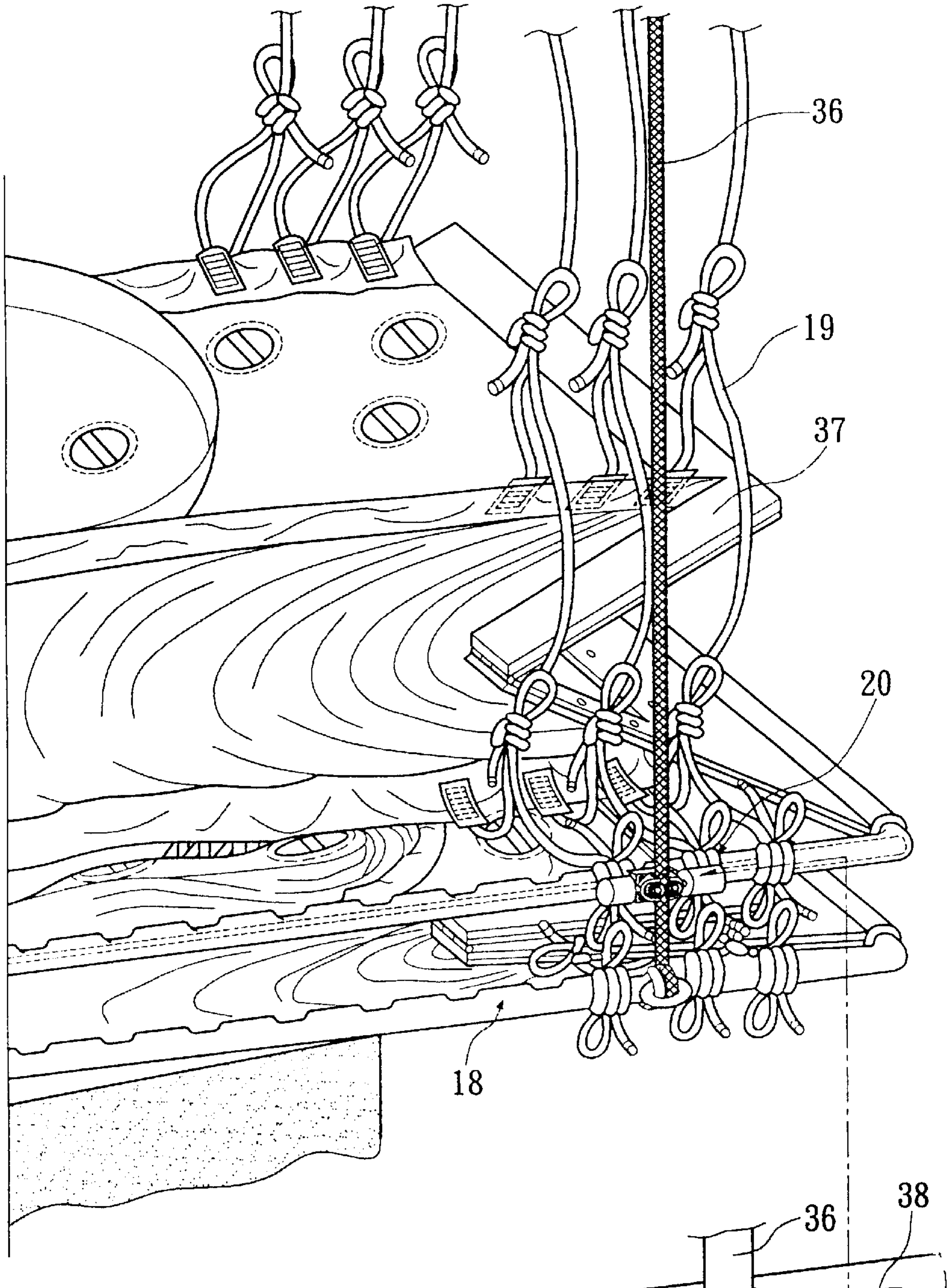
FIG. 9 is a perspective view showing the location of a steel-cable damper for the lowering-type collapsible spiral-tube escape way and the movable exit is deflected while the escape way is being elevated.
Figure 9A:
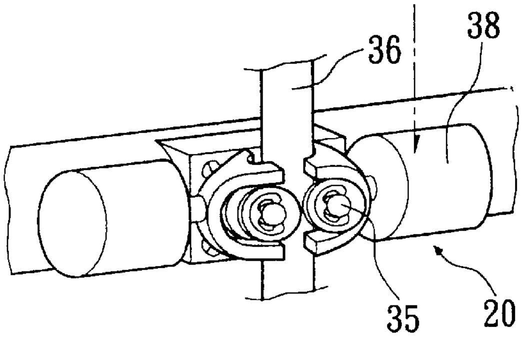
FIG. 9A is an enlarged perspective view of the steel-cable damper shown in FIG. 9.
Figure 13:
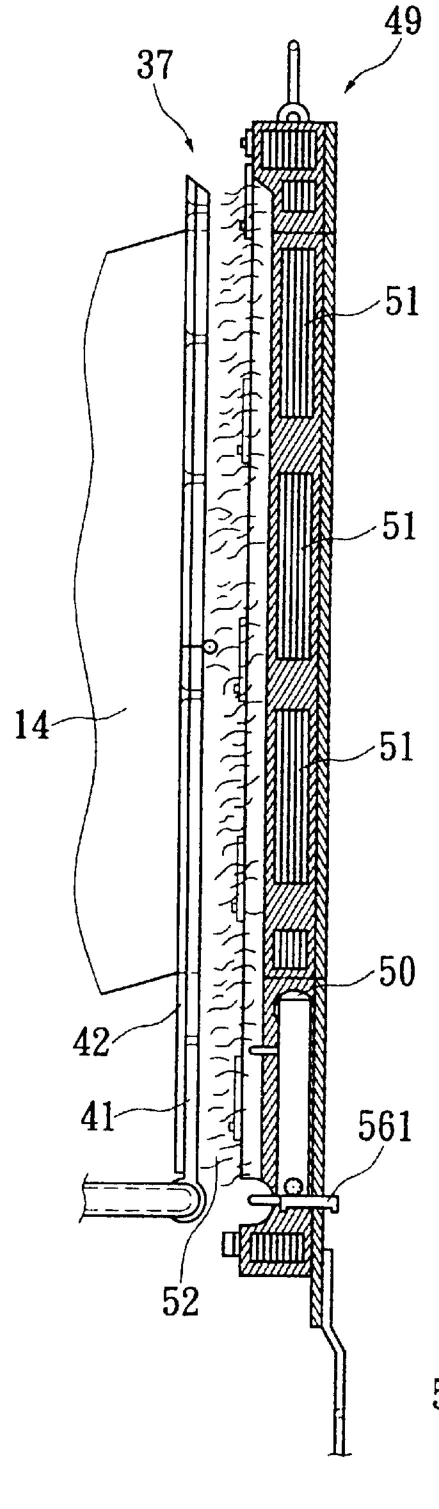
FIG. 13 is a partially sectioned side view showing the relation between the movable exit and the fixed exit for the lowering-type collapsible spiral-tube escape way.

The lowering-type escape way 1 is vertically lowered from the building roof for use. To save the time needed to fully lower the escape way 1, the steel-cable dampers 29 are mounted at, for example, four corners of each tube-supporting frame 18 to control steel cables 36 that elevate and lower the whole escape way 1, as shown in FIG. 9. FIG. 9A shows that each of the steel-cable clampers 29 includes a pair of steel wheels 35, between which a steel hoist cable 36 stably and smoothly passes to enable smooth elevating and lowering of the escape way 1. When the escape way 1 is lowered into position, a movable exit 37 connected to each spiral-tube unit of the escape way corresponding to each floor of the building is extended from a folded position into an upright position when the vertical suspension lines 19 are pulled straight. The movable exit 37 will be described in more details later. When the escape way 1 has been completely lowered into the operating position, oil cylinders mounted in frames of each movable exit 37 (refer to elements 541, 561 in FIGS. 12, 13 and 14) are actuated to drive oil cylinders 38 on each steel-cable damper 29, 30 that the dampers 29 tightly clamp the hoist cables 36 for the latter to aid the fireproof suspension lines 19 in holding the spiral tube 17 to the tube-supporting frames 18.

Figure 10:
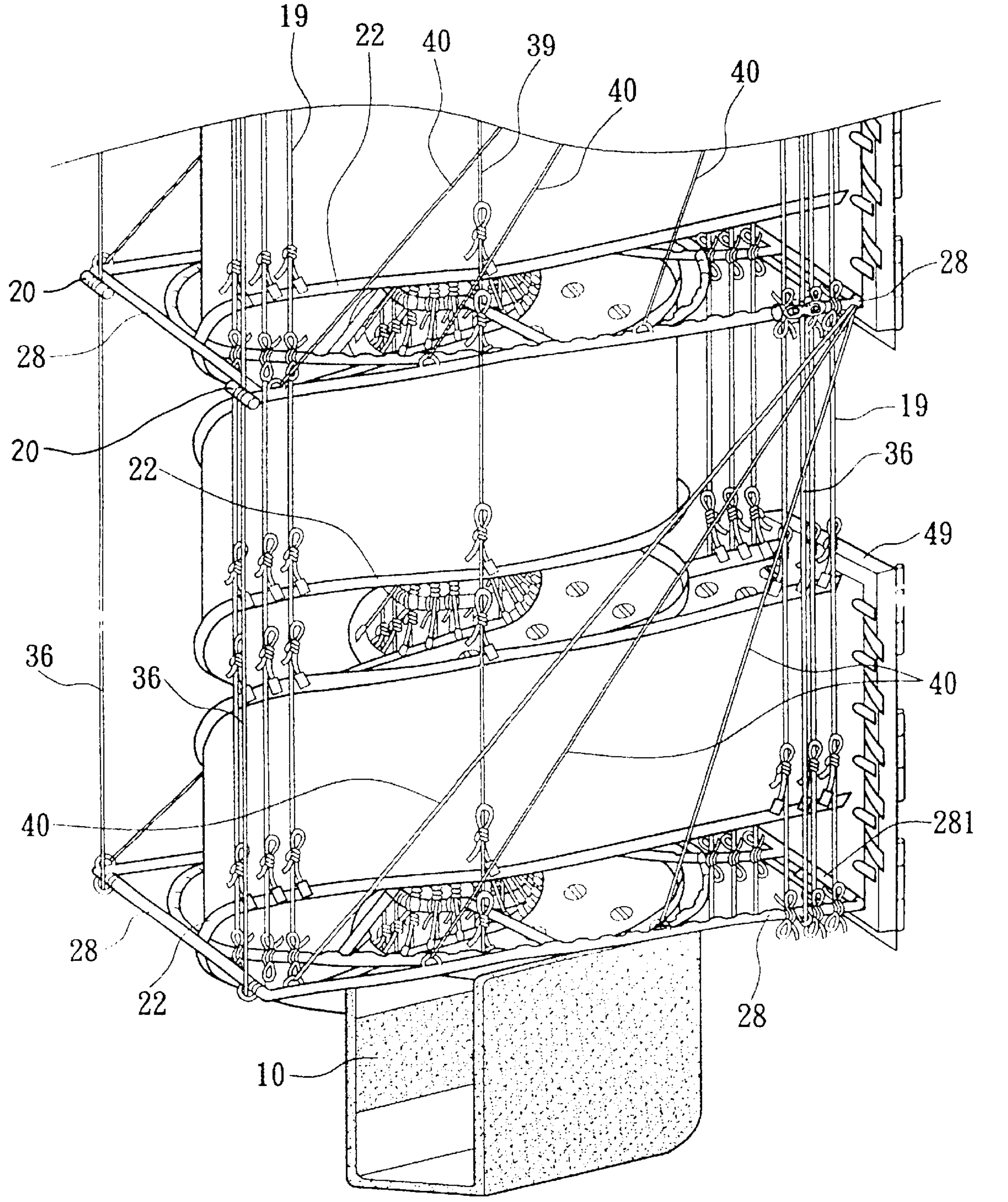
FIG. 10 shows the manner of tying the spiral-tube units of the lowering-type spiral-tube escape way to the tube-supporting frames with suspension lines.
Figures 11, 11A, 11B, 11C:
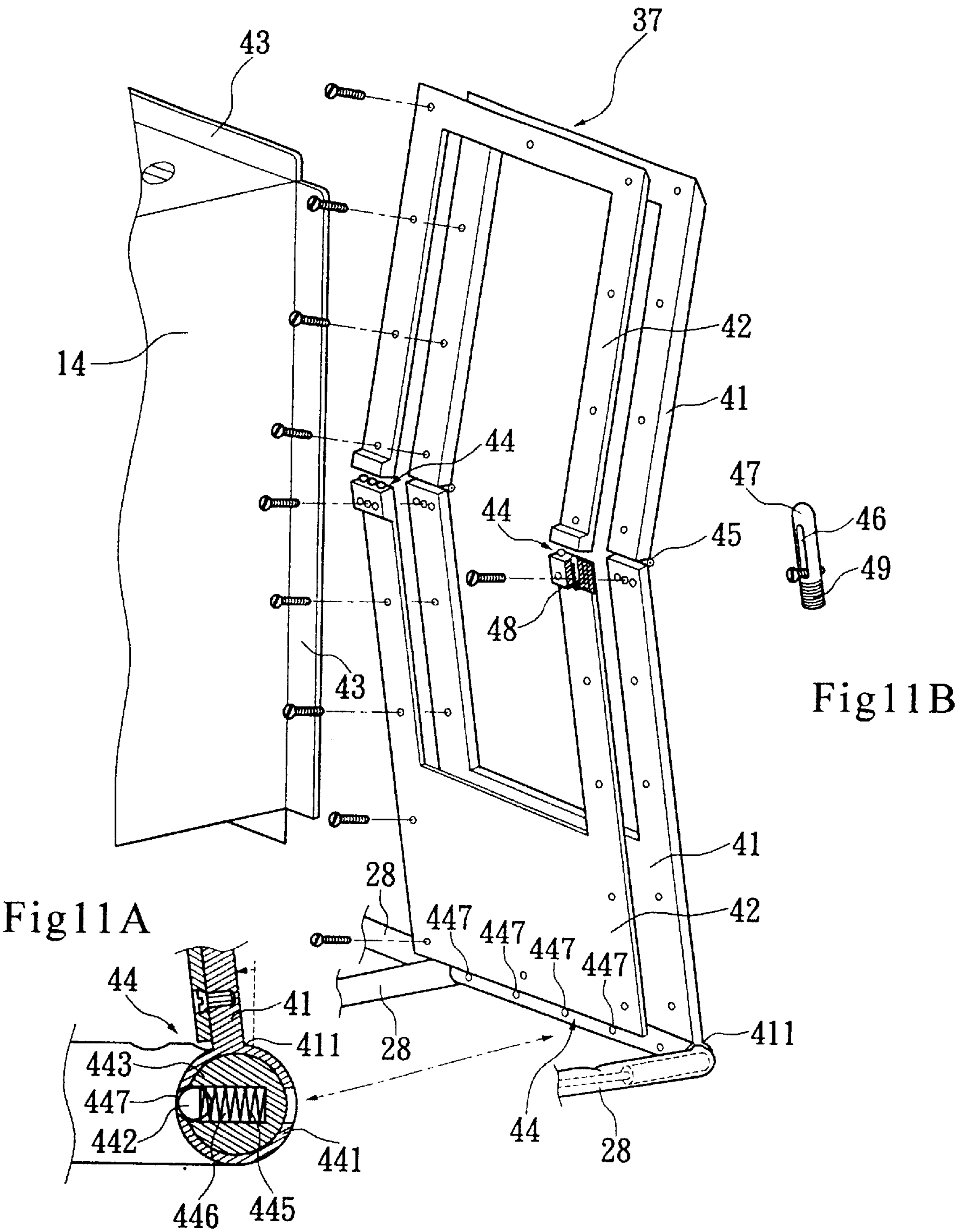
FIG. 11 is an exploded perspective view of the movable exit for the lowering-type collapsible spiral-tube escape way.
FIG. 11A is a fragmentary perspective view showing the connection of a slide passage for each spiral-tube unit of the collapsible spiral-tube escape way to the movable exit.
FIG. 11B is a perspective view of a first deflection button shown in FIG. 11.
FIG. 11C is a sectioned side view of a second deflection button shown in FIG. 11.
Figure 21:
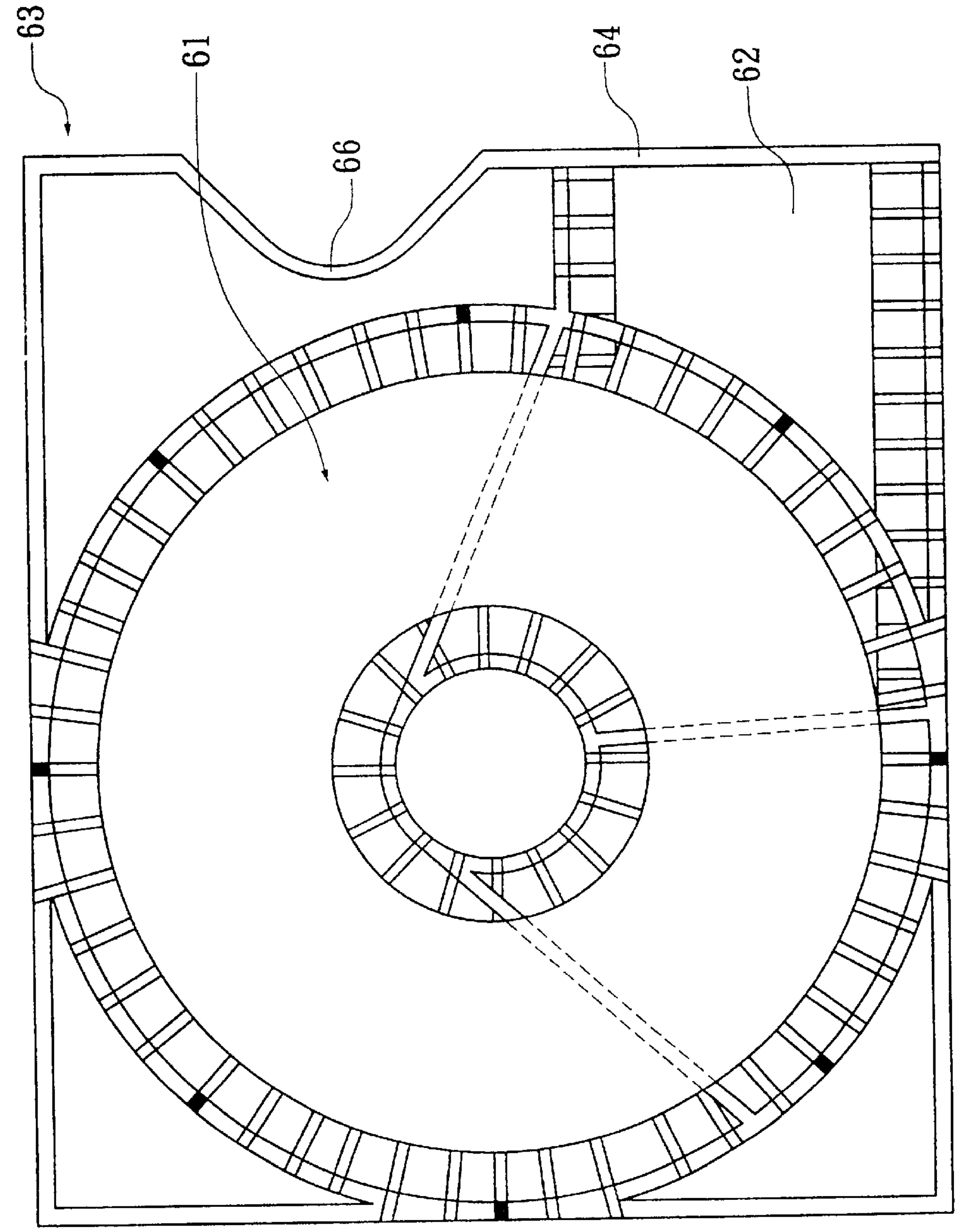
FIG. 21 is a top plan view showing the spiral tube of the tilting-type collapsible spiral-tube escape way is pulled open by suspension lines.
Figure 22:
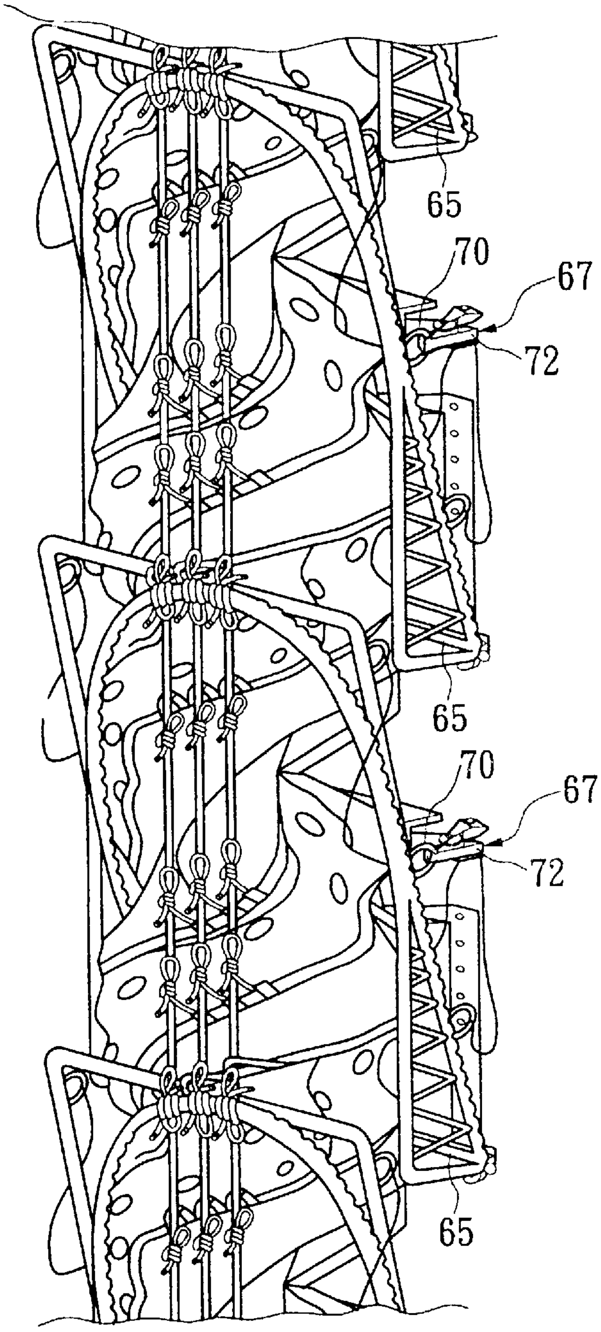
FIG. 22 is a fragmentary perspective view showing the tube-supporting frames of the tilting-type collapsible spiral-tube escape way and the spiral-tube units supported thereon are pivotally lifted about rear ends of the tube-supporting frames to a standby position.
Figure 22A:
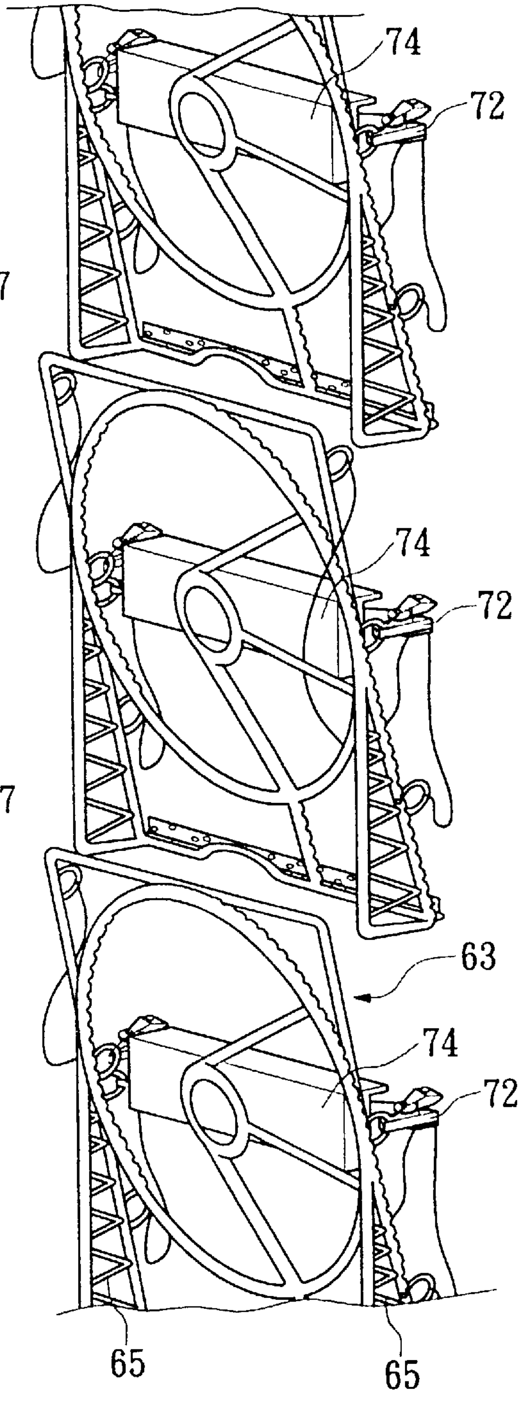
FIG. 22A is similar to FIG. 22 with the spiral-tube units removed from the tube-supporting frames.

Please refer to FIG. 10. The collapsible spiral-tube escape way 1 is also provided with vertical reinforcing steel cables 39 as another aid to the fireproof suspension lines 19 (see FIGS. 13 and 21 at the same time). There are also stay cables 40 provided between two adjacent tube-supporting frames 18 corresponding to each floor. The stay cables 40 are connected at upper ends to a common point on a rear end of the rectangular frame 28 of an upper one of the two adjacent tube-supporting frames 18, and at lower ends to spaced points on the rectangular frame 28 the lower one of the two adjacent tube-supporting frames 18. The stay cables 40 are very important because they have to be strong enough to independently support the spiral-tube unit for each floor and the weight of users without the hoist steel cables 36.

Please refer to FIGS. 11, 11A, 11B, and 11C. Each slide passage 14 is smoothly pulled open by corresponding tube-supporting frame 18, suspension lines 19 and 20, and movable exit 37. Each movable exit 37 includes a frame formed from two pieces of magnetic SUS 430 stainless frames 41, 42 that are screwed together. The slide passage 14 is connected at an end opposite to the spiral tube 17 to the movable exit 37 by tightly sandwiching L-shaped flanges 43 of the slide passage 14 between the two screwed stainless frames 41, 42. To enable easy taking up of the escape way when the building is emptied, each movable exit 37 is provided at predetermined positions with deflection mechanisms 44.

A first deflection mechanism 44 is located near middle pivot hinges 45 provided at left and right sides of the frame 41 of the movable exit 37. The first deflection mechanism 44 includes a plurality of substantially bullet-shaped steel buttons 47, each of which having a long slot 46 provided thereon. The steel buttons 47 are separately received in holes 48 provided on the stainless frame 42 facing toward the slide passage 14, and a spring 49 is located in each hole 48 below the steel button 47, so that a head of the steel button 47 is exposed from the hole 48. The steel buttons 47 are then firmly attached to the movable exit 37 by screws threaded through the long slots 46 on the steel buttons 47 into the stainless frame 41 behind the stainless frame 42. The exposed heads of the steel buttons 47 upward push against lower edges of an upper half-section at one side of the movable exit 37 without the pivot hinges 45, so that the frames 41, 42 of the movable exit 37 always deflect toward the spiral tube 17 when the escape way 1 is taken up toward the building roof.

A second deflection mechanism 44 is located in an outer pipe 441 welded to a lower end 411 of the stainless frame 41. The outer pipe 441 forms a part of the rear end of the rectangular frame 28 corresponding to the slide passage 14 and has a core member 443 mounted therein. The core member 443 is provided with a plurality of round holes 446 having a predetermined depth for each receiving a steel ball 442 and a spring 445 behind the steel ball 442, so that the steel ball 442 is pushed outward by the spring 445 to contact with a small round hole 447 formed on the outer pipe 441 corresponding to the round hole 446. Since each of the round holes 447 has a larger inner diameter and a smaller outer diameter, as can be seen in FIG. 1C, the steel ball 442 is actually partially seated in the small round hole 447. To enable the movable exit 37 to automatically deflect toward the spiral tube 17, the lower end 411 of the stainless frame 41 is welded closer to one side of the outer pipe 441 facing away from the slide passage 14. When the escape way 1 is elevated by upward taking up the hoist cables 36, all the vertical suspension lines 19 immediately become slacked, and the initially pulled-straight movable exits 37 is deflected at the deflection mechanisms 44 toward one side, as shown in FIG. 9, allowing the whole collapsible spiral-tube escape way 1 to be smoothly folded while being elevated to the standby position.

Figure 12:
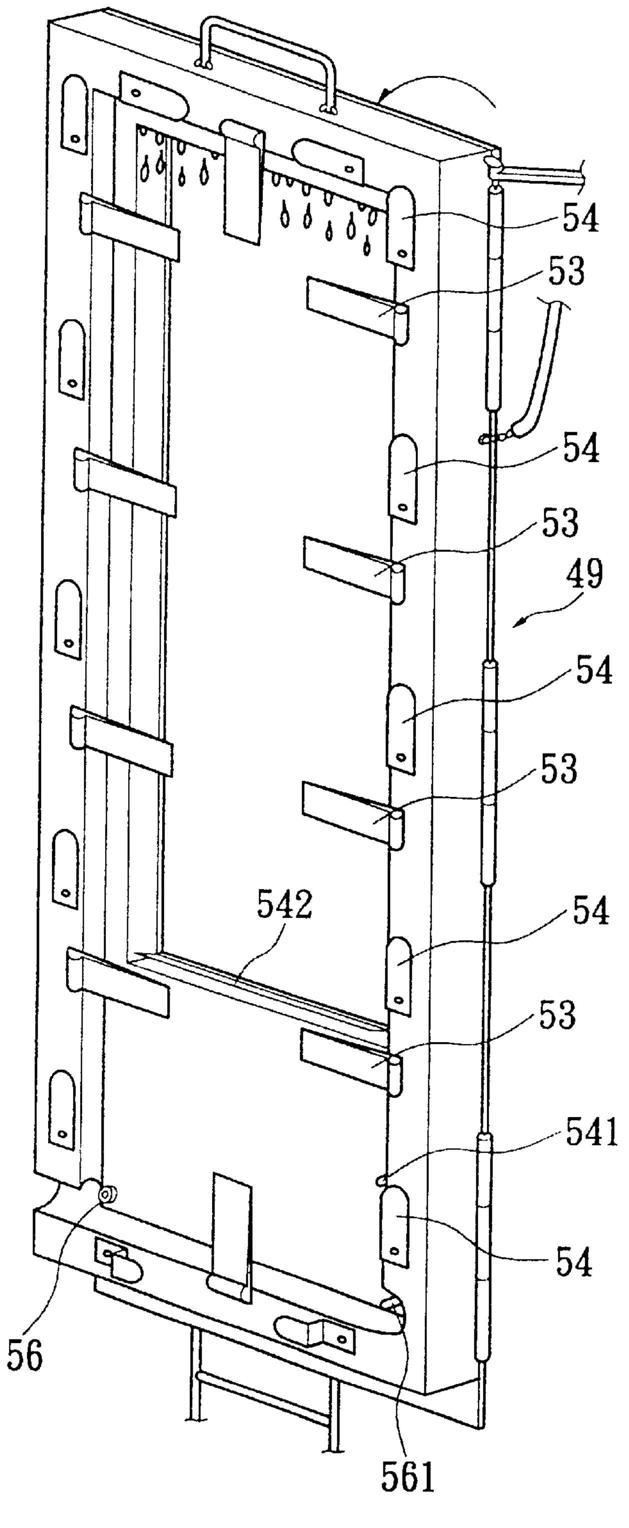
FIG. 12 is a perspective view of a fixed exit for the lowering-type collapsible spiral-tube escape way.
Figure 14:
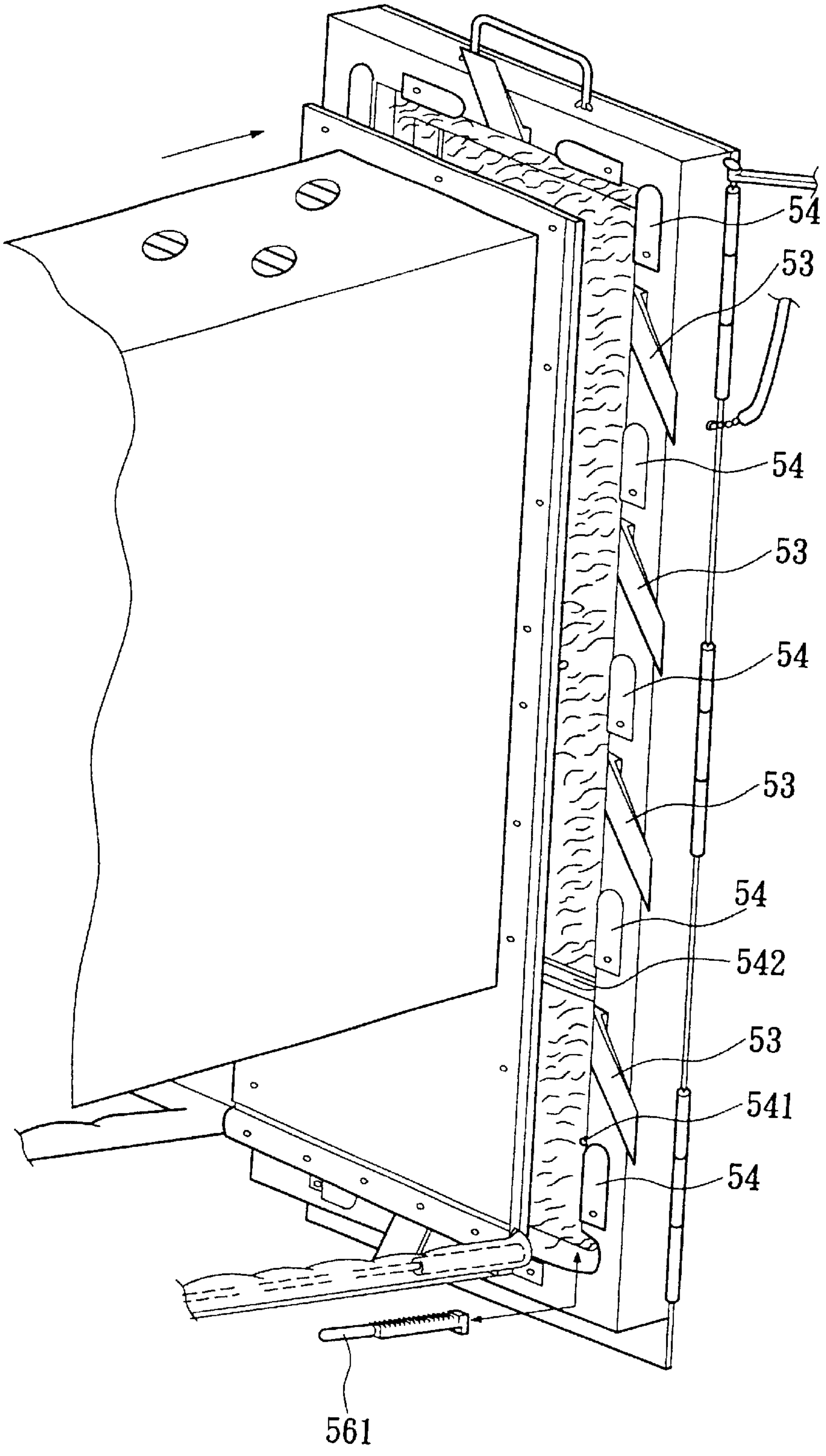
FIG. 14 is a fragmentary perspective view showing the movable exit of FIG. 13 is magnetically attracted toward the fixed exit.
Figure 15:
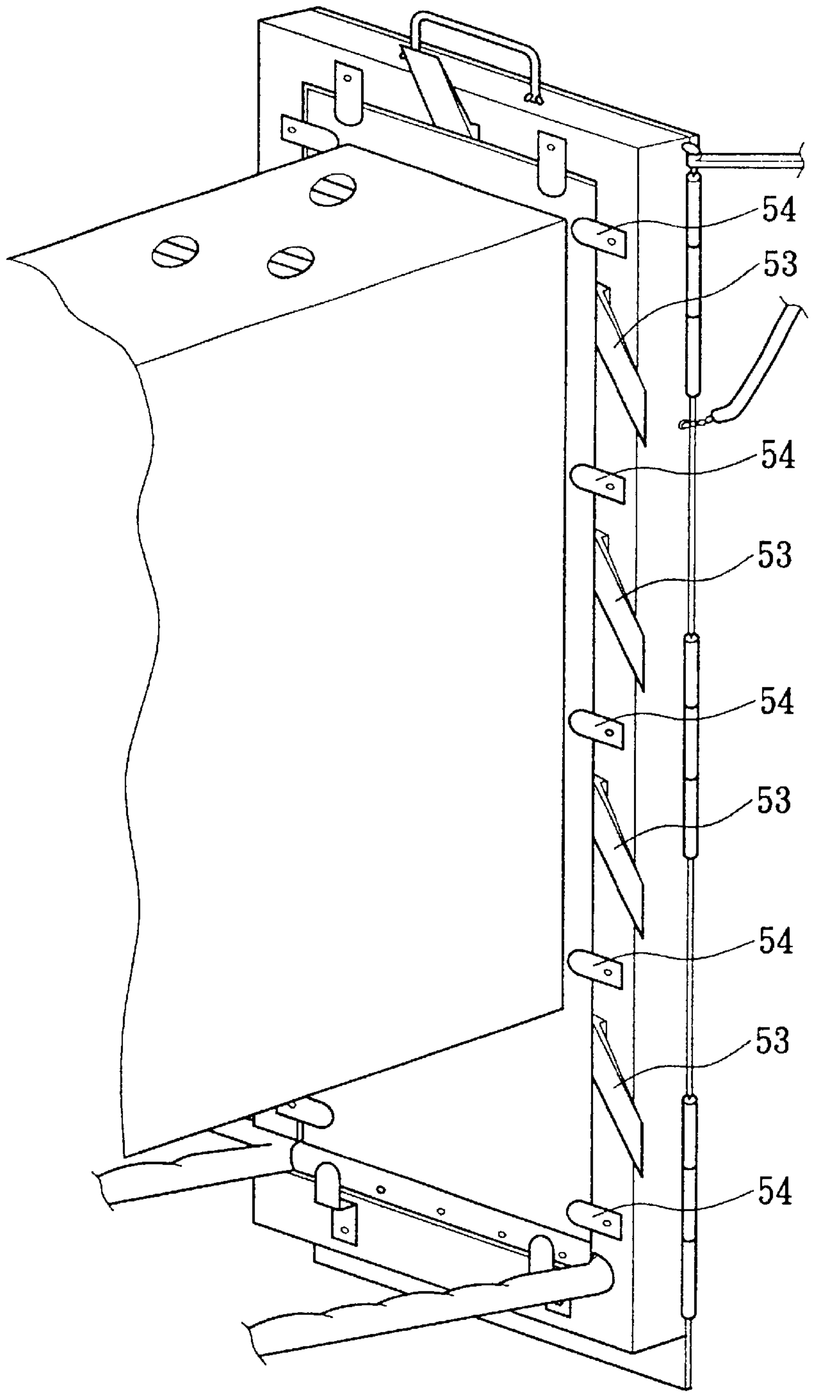
FIG. 15 shows the movable and the fixed exits for the lowering-type collapsible spiral-tube escape way are completely aligned and engaged with each other.
Figure 16:
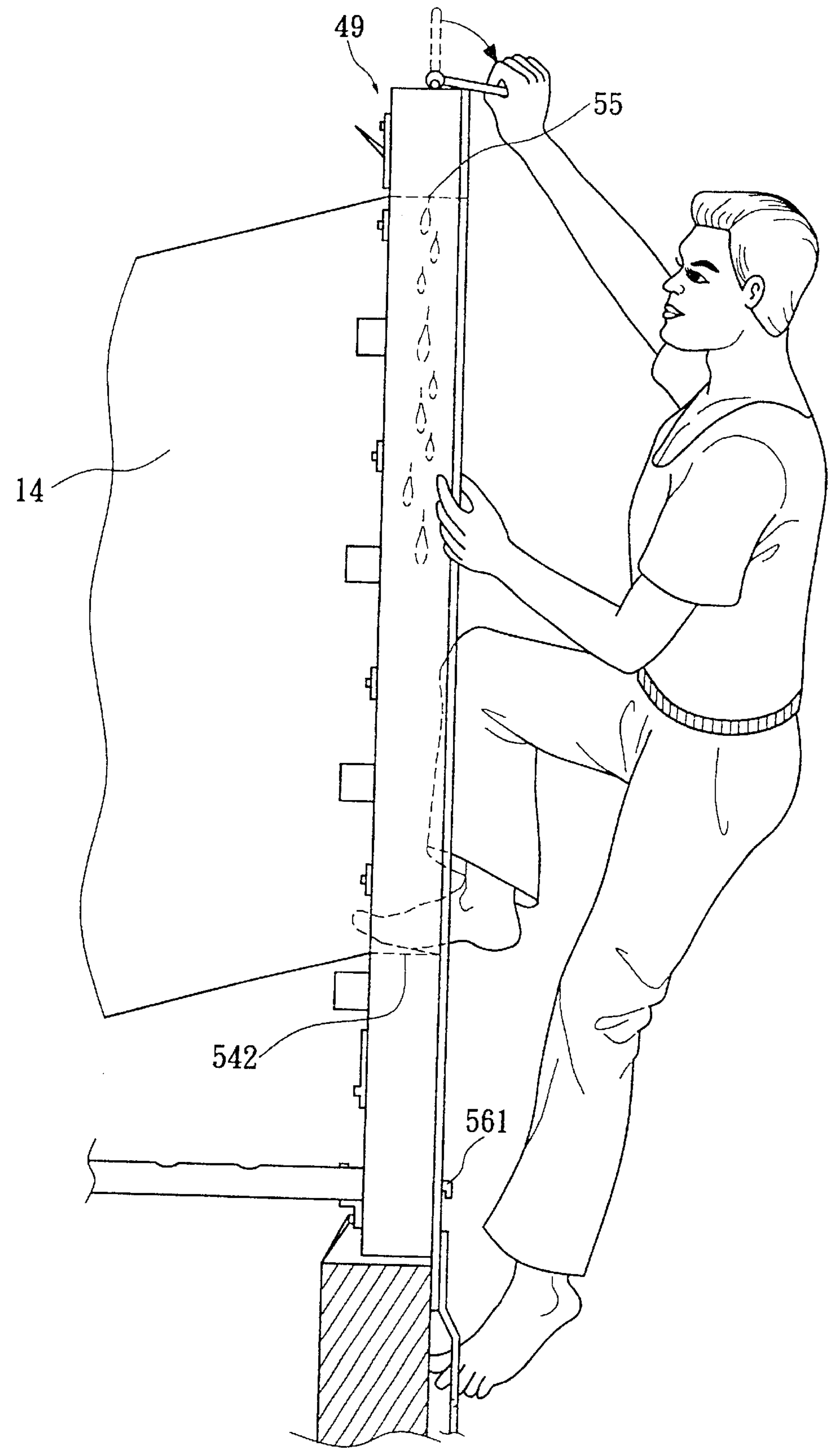
FIG. 16 shows a user climbs up the lowering-type collapsible spiral-tube escape way in an emergency.
Figure 17:
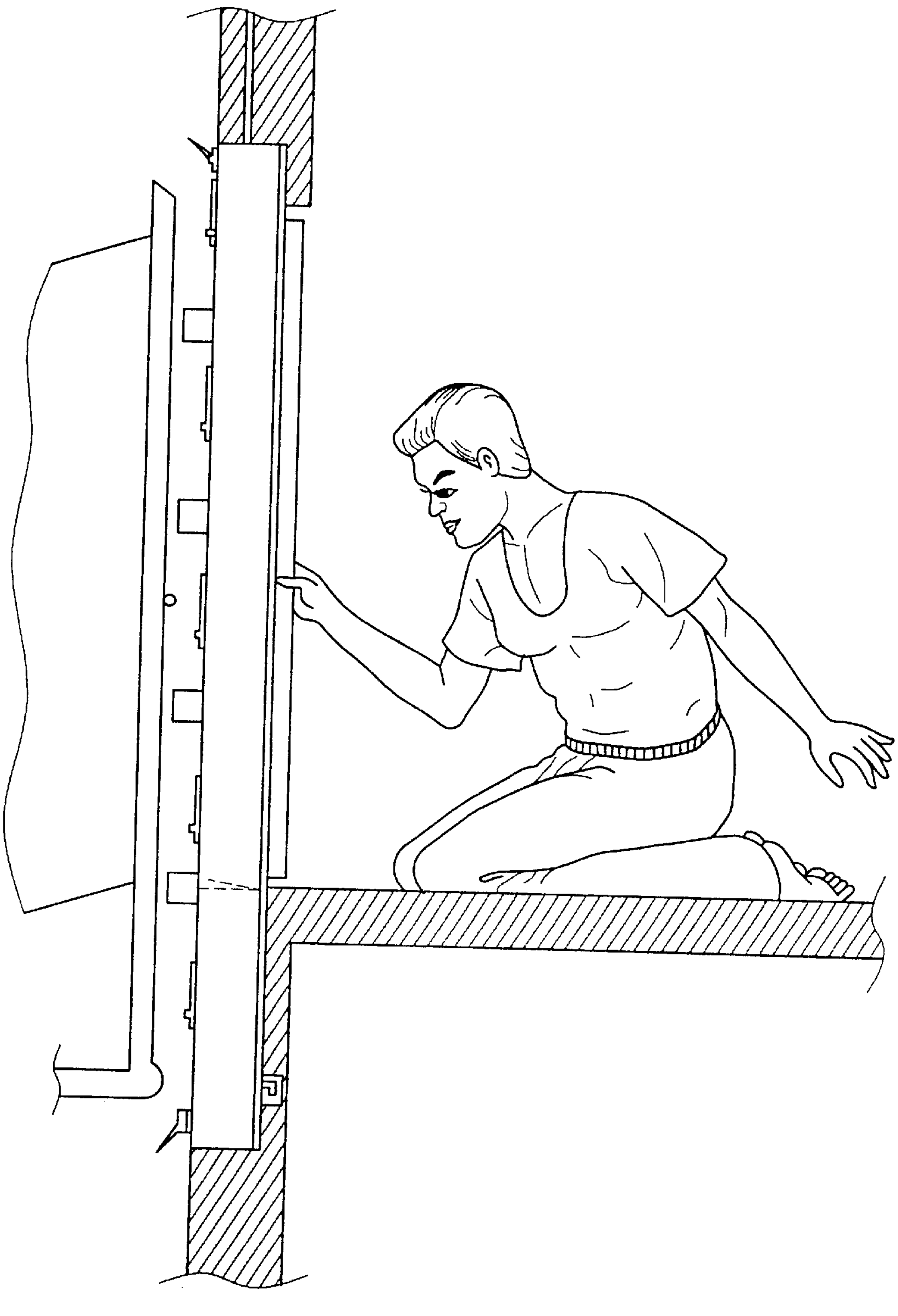
FIG. 17 shows a user opens a fire exit of the building before slides into the lowering-type collapsible spiral-tube escape way in an emergency.
Figure 18:
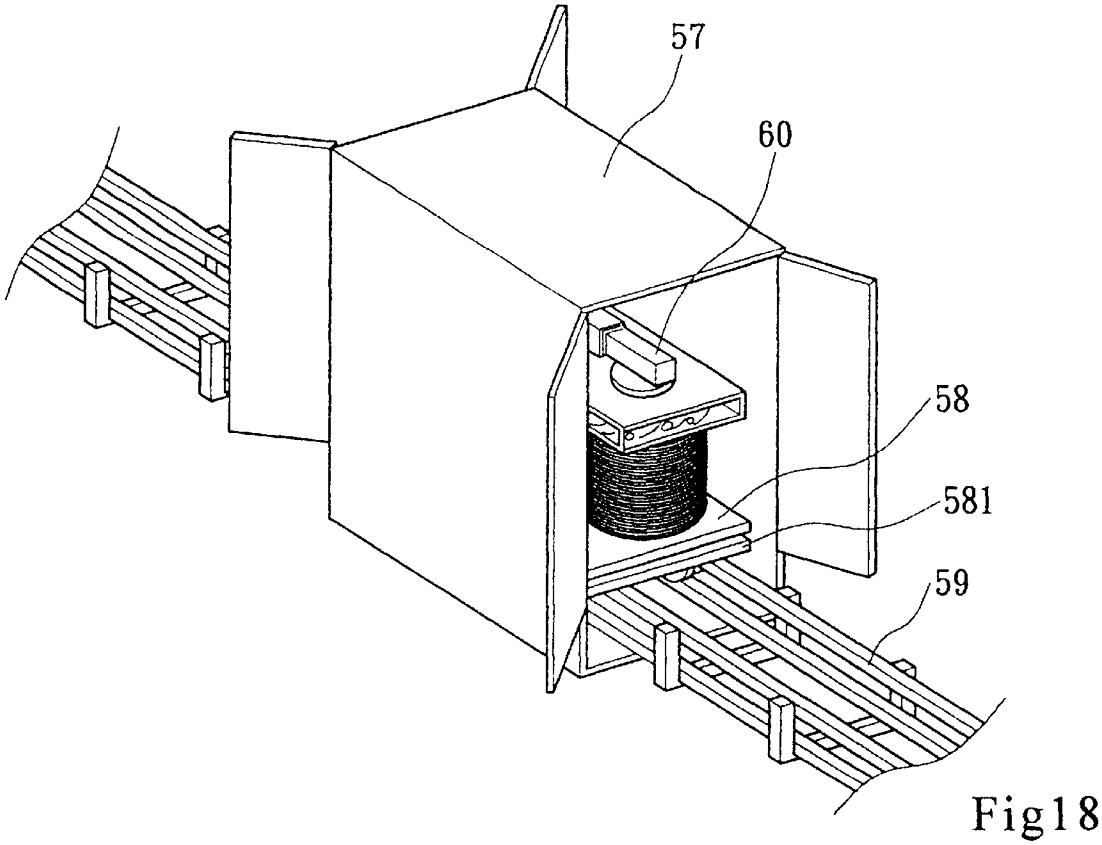
FIG. 18 is a perspective view of a protection chamber for the lowering-type collapsible spiral-tube escape way.
Figure 19:
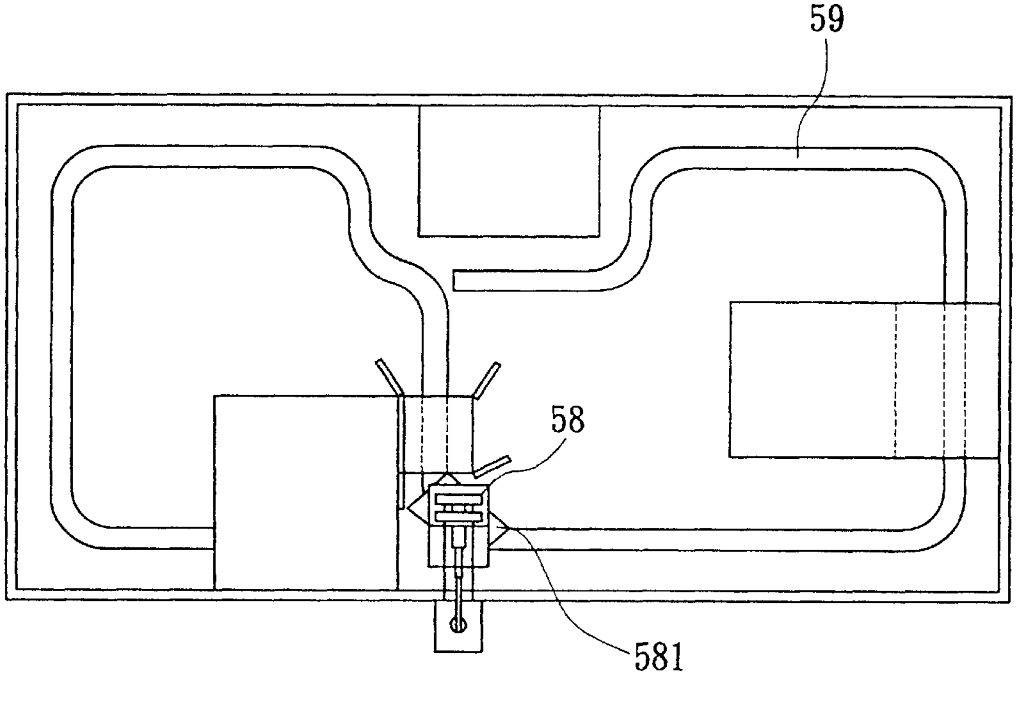
FIG. 19 is a top view showing the protection chamber, a crane equipment removably received in the protection chamber, and rails along which the crane equipment moves are mounted on a roof of a building to form a part of the lowering-type collapsible spiral-tube escape way of the present invention.

Please refer to FIGS. 12 to 17. When a user pushes an emergency button (not shown), the crane equipment 3 mounted on the roof is immediately driven to move, and small motors 50 provided in frames of fixed exits 49 correspondingly mounted outside the fire exits are started for electromagnets or coils 51 mounted in the fixed exits 49 to generate magnetic force 52. Meanwhile, the fixed exits 49 are turned toward the exterior wall of the building to wait for the movable exits 37 on the escape way 1 lowered from the crane equipment 3. Each of the fixed exits 49 is provided on a frame with inward closable aligning arms 53, which are pivotally turned outward when the escape way 1 is lowering, as shown in FIGS. 14 and 15, in order to correct any possible error in the position of a corresponding one of the movable exits 37 moving toward the fixed exit 49. When the escape way 1 is fully lowered, stopped, and automatically moved toward the exterior wall of the building through operation of an extension arm of the crane equipment 3, the movable exits 37, due to the SUS 430 stainless frames 41, 42 thereof, are magnetically attracted by the magnetic force 53 toward the fixed exits 49 as soon as they are in contact with one another. At this point, a push button 541 provided on each of the fixed exits 49 is pushed inward to actuate mechanical mechanisms inside the frames of the fixed exits 49, causing catches 54 mounted on the frames of the fixed exits 49 to move into positions for firmly holding the movable exits 37 to the fixed exits 49. The collapsible spiral-tube escape way 1 is now ready for use. A spray-actuating plate 542 is provided on a threshold of each fixed exit 49. When a user climbs up the fixed exit 49 and steps on the spray-actuating plate 542 mounted on the threshold, water is sprayed from spray holes 55 provided at upper side of the fixed exit 49. Alternatively, a water outlet 56 may be provided at a lower left corner of the fixed exit 49, as shown in FIG. 12, so that water is supplied from the water outlet 56 to the tube-supporting frame 18 to wet the suspension lines 19, 20 and the spiral tube 17. FIG. 16 illustrates only an example of mounting the fixed exit 49 on the building for users to climb up the collapsible spiral-tube escape way 1. FIG. 17 illustrates another way of mounting the fixed exit 49, in which the fixed exit 49 has a bottom flush with the floor.

Please refer to FIGS. 1, 18, 19, and 20. To use the lowering-type escape way 1, a user needs only to push an emergency button. A voice warning will immediately sound in the whole building to indicate the selected fire exit and instruct other users to escape via the selected exit. Meanwhile, a protection chamber 57 at the roof is opened, engine and motor in a machine box 58 of the crane equipment 3 are started, and a battery prepared in advance starts working, enabling the machine box 58 to quickly move along rails 59 on the roof to a position above the selected fire exit at where the emergency button is pushed. An extension arm 60 is extended to a suitable length to allow quick lowering of the collapsible spiral-tube escape way 1. When the escape way 1 has been fully lowered, it is then pulled closer to the wall of the building to gradually align and engage the movable exits 37 with the fixed exits 49 that have already been waiting at each floor. Since the crane equipment 3 and the collapsible spiral-tube escape way 1 are light in weight and could therefore be quickly moved.

Figure 20:
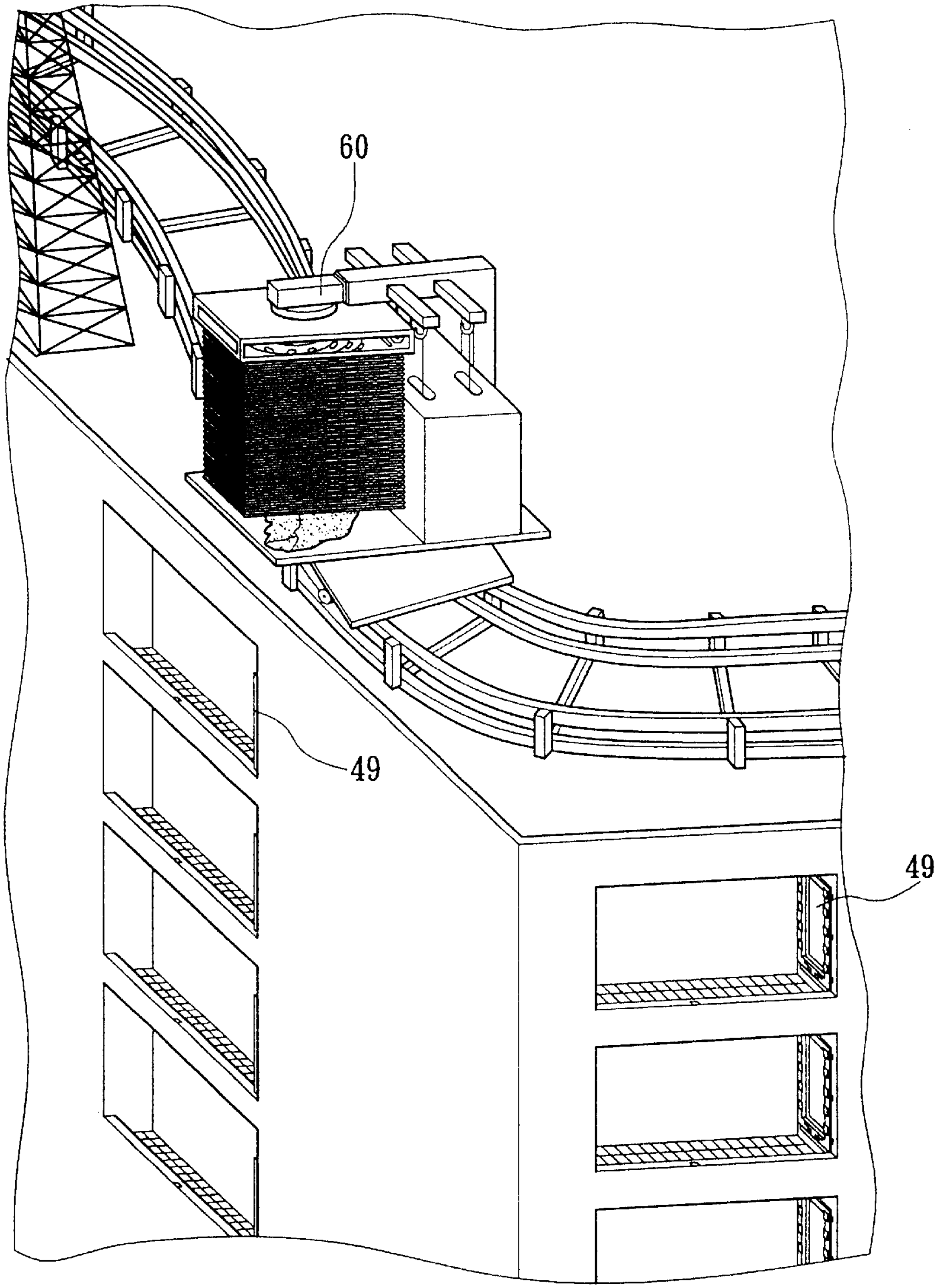
FIG. 20 shows the crane equipment of FIG. 19 is moved out of the protection chamber and then moves along the rails to locate above selected exits of the building.
Figure 20A:
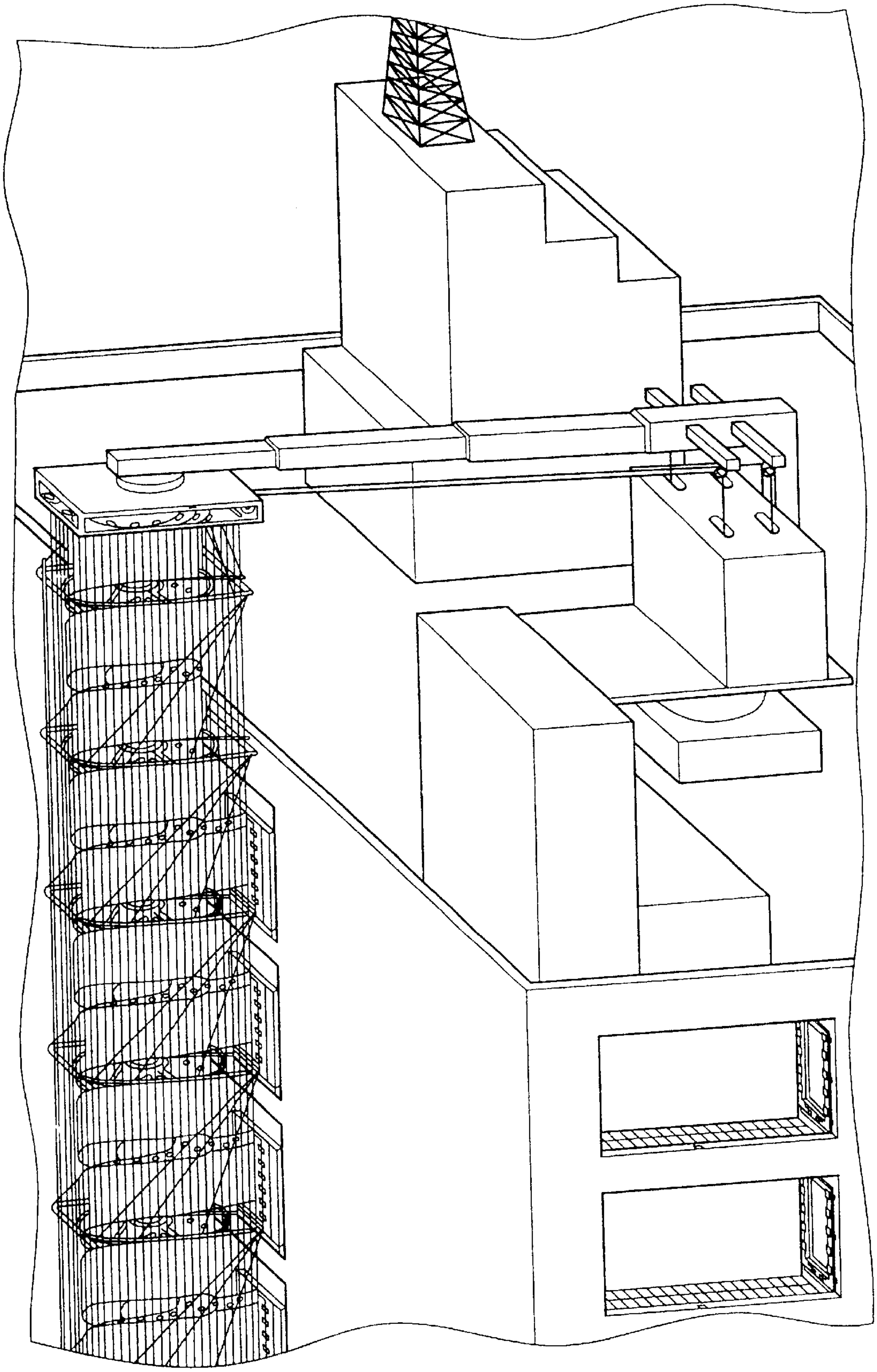
FIG. 20A shows that the lowering-type collapsible spiral-tube escape way of the present invention may also be operated through a fixed-type crane equipment mounted on the roof.

It is possible the roof has many obstacles thereon, as shown in FIG. 20A. In this case, the crane equipment 3 may be otherwise mounted at a fixed position on the roof to allow the extension arm 60 of the crane 3 to deliver the collapsible spiral-tube escape way 1 beyond the obstacles, so that the lowering-type escape way 1 could be lowered for use.

Please refer to FIGS. 2, 21, 22, and 22A. The tilting-type escape way 2 is particularly designed for a building established on a smaller compound, and includes a continuous spiral tube 61, slide passages 62, and tube-supporting frames 63 structurally similar to the spiral tube 17, the slide passages 14, and the tube-supporting frames 18 of the lowering-type escape way 1. Each of the tube-supporting frames 63 includes an outer rectangular frame 64 having reinforcements 65 formed from steel pipes and bars provided at two lower rear sides of the rectangular frame 64. Each of the rectangular frames 64 is provided at an upper rear end with a connecting plate 68 adapted to firmly screw onto the wall of the building. To allow the tube-supporting frames 63 to separately pivotally connect at the rear end to the wall and locate outside a series of fire exits of the building, tilting steel cables 69 are extended from the wall to connect their outer ends to rings 70 welded to two lateral sides of the tube-supporting frames 63. To avoid the tube-supporting frames 63 in a taken-up or standby position from interfering with transmission mechanisms 67 mounted on the wall of the building corresponding to the tube-supporting frames 63, each of the rectangular frames 64 has a rear end adjacent to the wall of the building formed into a radially inward curved portion 66, and is slightly tilted forward to provide a space between the tube-supporting frame 63 and the transmission mechanism 67. When the tilting-type escape way 2 is in the standby position to closely locate in front of the wall, each tube-supporting frame 63 is held close to the wall by hooking the rings 70 onto electric claw hooks 72 mounted on the wall. And, to prevent a double-grooved steel wheel 73 of the transmission mechanism 67 from frictional contact with the spiral tube 61, a protective cover 74 is provided at an outer side of the transmission mechanism 67 to isolate the latter from the spiral tube 61.

Figure 23:
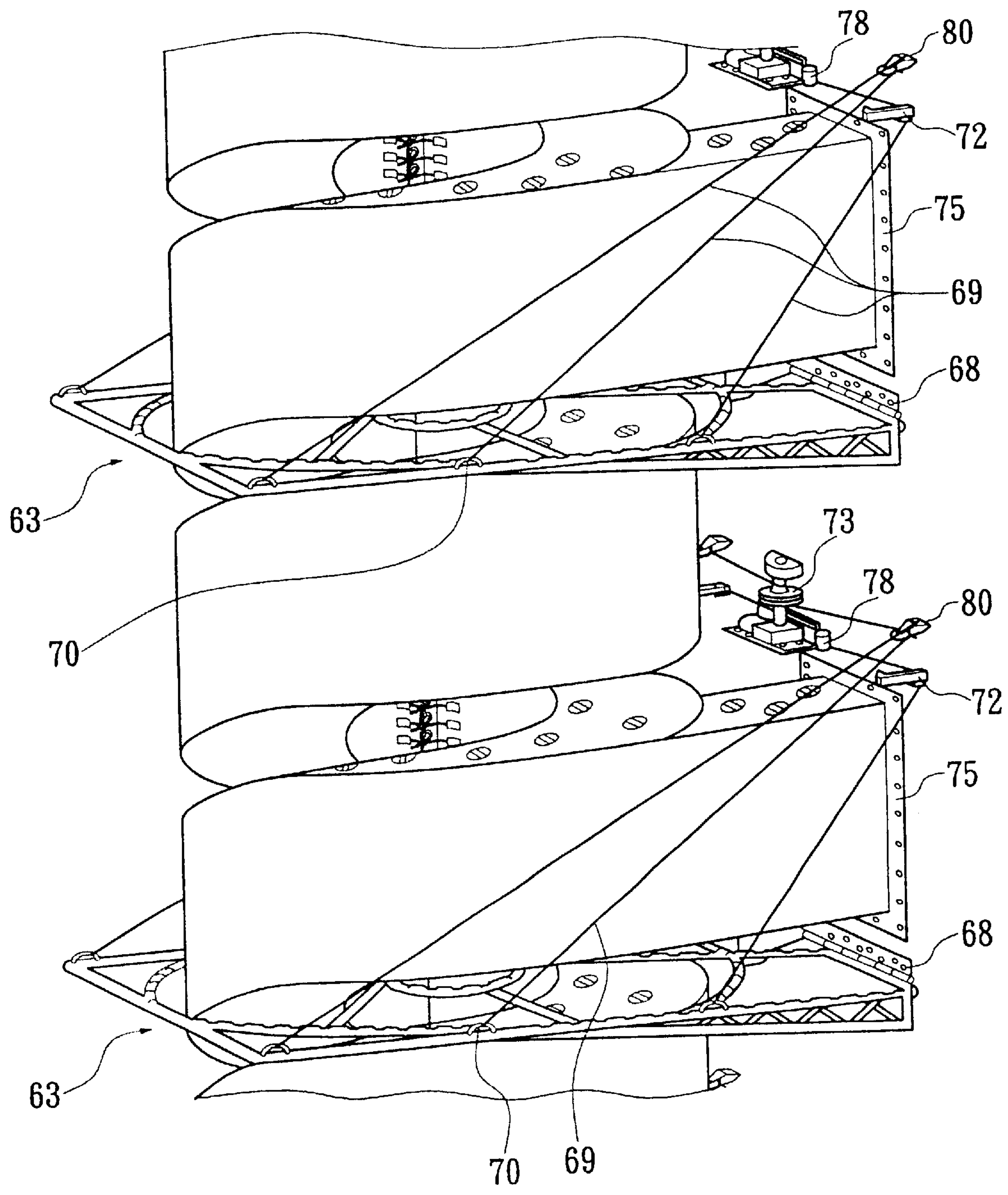
FIG. 23 shows the relation among tube-supporting frames, spiral-tube units, and transmission mechanisms of the tilting-type collapsible spiral-tube escape way.

The tilting-type escape way 2 and the lowering-type escape way are identical in the structures of the spiral tubes, the vertical and the horizontal suspension lines, and the vertical reinforcing steel cables (see FIGS. 10 and 23). However, the tilting-type escape way 2 in the standby state is generally vertically attached to the wall of the building, and flanges of the slide passages 62 are tightly clamped by and screwed to stainless frames 75 mounted around the fixed exits on the building.

Figure 24:
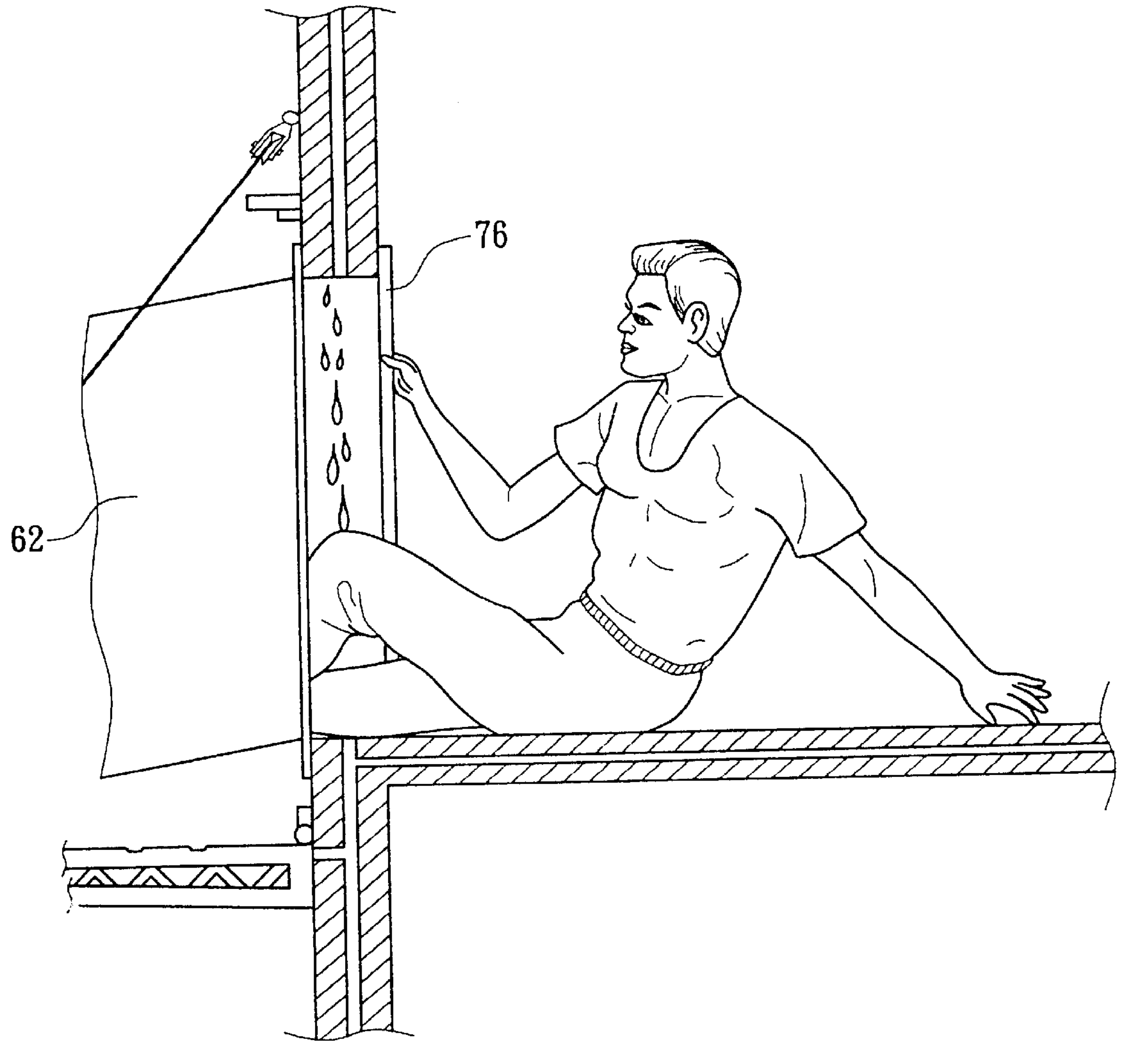
FIG. 24 shows the manner of using the tilting-type collapsible spiral-tube escape way in an emergency.
Figure 25:
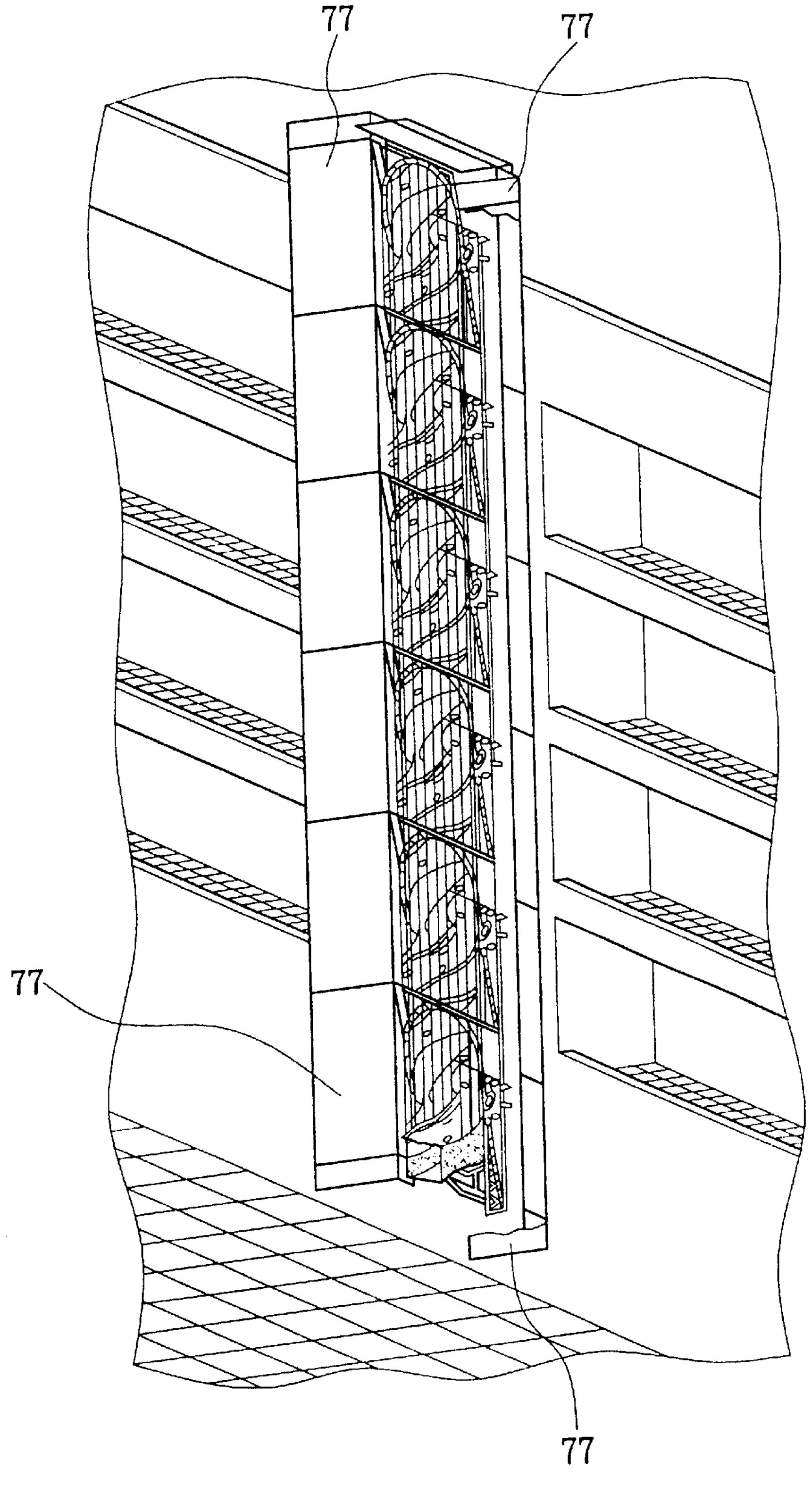
FIG. 25 shows the tilting-type collapsible spiral-tube escape way of the present invention being lifted the standby position.

Please refer to FIGS. 24 and 25. In the event of an emergency, such as a fire, the user needs only to open a door 76 of the closest fire exit and a voice warning will sound in the whole building to inform other users in the building about the emergency. Meanwhile, all external protection doors 77 that are mounted outside the building and usually closed to protect the escape way 2 from external environment are immediately opened now. At this point, electromagnets 78 included in the transmission mechanisms 67 will cause the claw hooks 72 (see FIG. 22) to release the rings 71, and one or more small motors included in each transmission mechanism 67 corresponding to each floor for balancing power load of each transmission mechanism 67 and synchronous tilting of the tube-supporting frames 63 will actuate a speed changer 79 and a double-grooved steel wheel 73 to allow the tilting steel cables 69 passing pulleys 80 to tilt the tube-supporting frames 63 to a horizontal position, so that all the spiral-tube units 61 connected to the frames 63 are synchronously pulled open for use, as shown in FIGS. 23 and 24. When the tilting-type escape way 2 is not in use, it may be actuated to operate in reverse sequences and be taken up to the standby position. Finally, the external protection doors 77 are closed to shield the escape way 2 from the external environment. It is possible to construct a new building with a recess on the exterior wall reserved for the tilting-type escape way 2, so that the closed external protection doors 77 are flush with the exterior wall of the building to give the building a beautiful appearance. This way is applicable to the general curtain-wall buildings.

Figure 26:
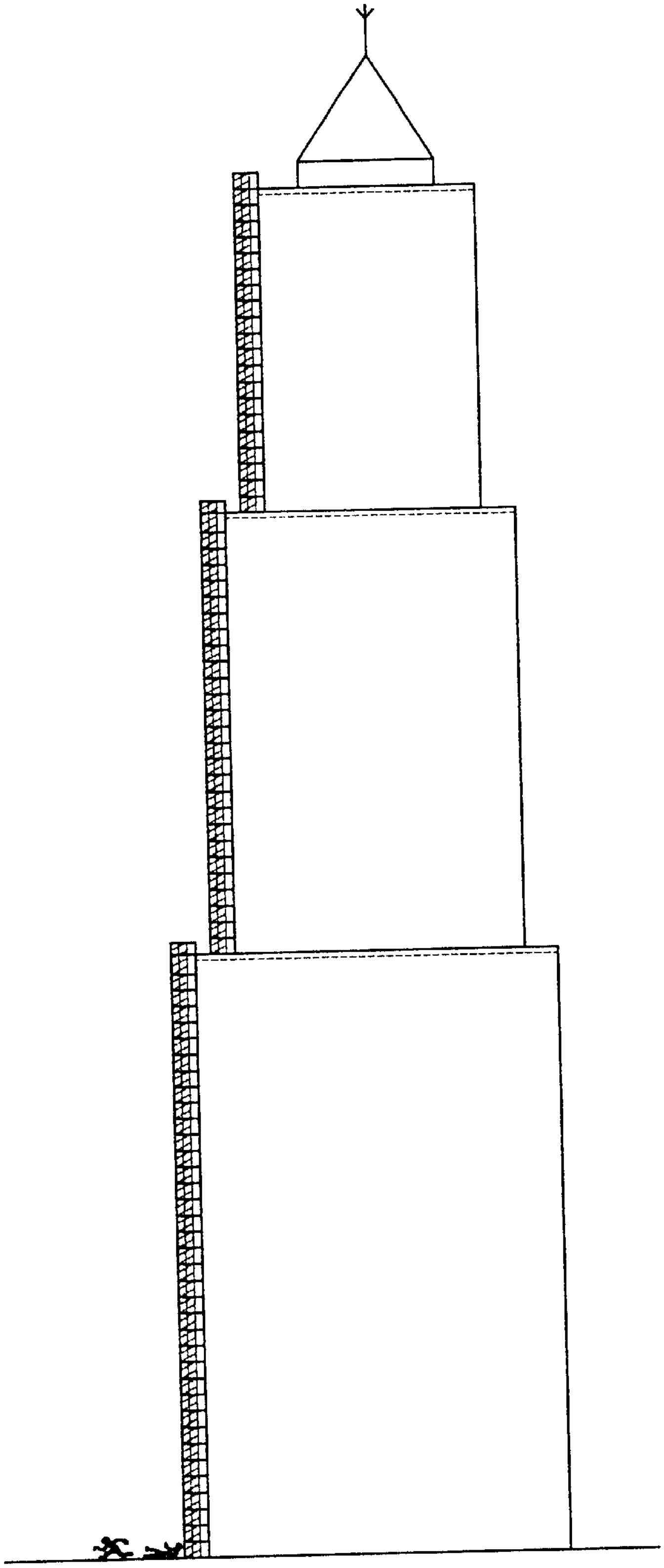
FIG. 26 shows the collapsible spiral-tube escape way the present invention may be used on a building with setbacks.

In the case of a high-rise building having setbacks, as shown in FIG. 26, the collapsible spiral-tube escape way, either the lowering type or the tilting type, may be divided into several sections corresponding to the number of setbacks and be separately mounted onto the building.

What is claimed is:

1. A collapsible spiral-tube escape way structured to be lowered from a roof of a building for use through operation of a crane equipment mounted on the roof of the building, comprising a spiral tube, a plurality of slide passages, a plurality of tube-supporting frames, a plurality of vertical suspension lines, a plurality of horizontal suspension lines, a plurality of hoist steel cables, a plurality of groups of stay cables, and a plurality of movable exits;

said spiral tube being formed from a plurality of serially connected spiral-tube units, each of which including one or more turns; each turn of said spiral-tube unit being formed from an upper, a lower, an inner, and an outer panel made of a fireproof fabric; said spiral tube being connected at each of said spiral-tube units to said plurality of tube-supporting frames via said plurality of vertical and horizontal suspension lines, such that said spiral tube could be fully pulled open to provide a spirally extended way when said escape way has been fully lowered;

each of said plurality of slide passages being formed from an upper, a lower, an inner, and an outer panel made of a fireproof fabric, and being connected at a first open-end to one side of one of said turns of each said spiral-tube unit to communicate with an internal space of said spiral tube, and at a second open end to one of said plurality of movable exits;

each of said plurality of tube-supporting frames being provided at a respective one of said plurality of movable exits, and including an inner round frame, an outer round frame, a plurality of inner-round-frame braces, and an outer rectangular frame; each of said tube-supporting frames being connected to said spiral tube via said vertical and said horizontal suspension lines, such that said spiral tube is pulled open between said inner and said outer round frames of said plurality of tube-supporting frames to spirally extend in a vertical direction;

said plurality of hoist steel cables being connected at upper ends to said crane equipment mounted on the roof and at lower ends to a lowest one of said plurality of tube-supporting frames for lowering and elevating said collapsible spiral-tube escape way;

each group of said plurality of stay cables being provided for a respective one of said spiral-tube units, and being connected at upper ends to a rear end of said outer rectangular frame of a tube-supporting frame above said respective one of spiral-tube unit, and at lower ends to spaced points on two lateral sides of said rectangular frame of said tube-supporting frame of said respective spiral-tube unit, so as to aid said hoist steel cables, and said vertical and said horizontal suspension lines in supporting weight of said tube-supporting frames and users;

said plurality of vertical suspension lines being connected to said inner and said outer round frames of said tube-supporting frames, and each of said plurality of horizontal suspension lines being connected at a head end to one of said vertical suspension lines and at a tail end to a seam of said spiral tube to sidewardly pull open said spiral tube; and each of said plurality of movable exits including an outer frame that is adapted to tightly hold L-shaped flanges of each of said slide passages thereto and to move toward and firmly connect to a fixed exit mounted on each floor of the building, so that a user may enter into said slide passage and accordingly said spiral tube via said fixed and said movable exits; and said collapsible spiral-tube escape way being normally elevated to the roof of the building and collapsed into a standby state for sitting on said crane equipment, and being quickly lowered from said crane equipment in an emergency to locate said plurality of movable exits in front of said fixed exits on the building, allowing users on different floors of the building to enter into said slide passages and accordingly said spiral tube via said fixed and said movable exits, and slide all the way down to the ground.

2. The collapsible spiral-tube escape way as claimed in claim 1, wherein each of said outer rectangular frames has steel-cable dampers symmetrically provided thereon for firmly clamping said hoist steel cables in place when said collapsible spiral-tube escape way has been fully lowered and each of said movable exits is connected to a corresponding one of said fixed exits on the building.

3. The collapsible spiral-tube escape way as claimed in claim 1, wherein said slide passages are separately connected to one side of said spiral-tube units; wherein when said spiral-tube escape way turns right-handed, said slide passages are connected to left side of said spiral-tube units, and when said spiral-tube escape way turns left-handed, said slide passages are connected to right side of said spiral-tube units, allowing users to smoothly slide forward into said spiral tube via said slide passages.

4. The collapsible spiral-tube escape way as claimed in claim 1, wherein said tube-supporting frames may also serve as water pipes and comprises spray holes, allowing water supplied thereto to spray via said spray holes to wet said vertical and said horizontal suspension lines connected to said tube-supporting frames.

5. A collapsible spiral-tube escape way structured to be tilted from an exterior wall of a building for use through operation of transmission mechanisms separately mounted on the exterior wall of the building, comprising a spiral tube, a plurality of slide passages, a plurality of tube-supporting frames, a plurality of vertical suspension lines, a plurality of horizontal suspension lines, and a plurality of protection doors;

said spiral tube being formed from a plurality of serially connected spiral-tube units, each of said spiral-tube units including one or more turns; each turn of said spiral-tube unit being formed from an upper, a lower, an inner, and an outer panel made of a fireproof fabric; said spiral tube being connected at each of said spiral-tube units to said plurality of tube-supporting frames via said plurality of vertical and horizontal suspension lines, such that said spiral tube is fully pulled open to provide a spirally extended way when said escape way is in an operating position;

each of said plurality of slide passages being formed from an upper, a lower, an inner, and an outer panel made of a fireproof fabric, and being connected at a first open end to one side of one of said turns of each said spiral-tube unit to communicate with an internal space of said spiral tube, and at a second open end to one of a plurality of fixed exits mounted on said exterior wall of said building;

each of said plurality of tube-supporting frames being provided at a respective one of said plurality of fixed exits, and including an inner round frame, an outer round frame, a plurality of inner-round-frame braces, and an outer rectangular frame; each of said tube-supporting frames being connected to a corresponding one of said spiral-tube units via said vertical and said horizontal suspension lines, such that said spiral-tube units are pulled open between said inner and said outer round frames of said plurality of tube-supporting frames to spirally extend in a vertical direction; each of said rectangular frames being connected at a rear end adjacent to said exterior wall to a connecting plate that is screwed onto the exterior wall to allow said rectangular frame to pivotally turn about the rear end by 90 degrees; each of said rectangular frames also being provided at two lateral sides with a plurality of rings, to each of which a lower end of a tilting steel cable is connected; and said rings are caught by claw hooks fixedly mounted on the exterior wall when each of said tube-supporting frames is pivotally lifted adjacent to the front of the exterior wall;

said plurality of vertical suspension lines being connected to said inner and said outer round frames of said tube-supporting frames, and each of said plurality of horizontal suspension lines being connected at a head end to one of said vertical suspension lines and at a tail end to a seam of said spiral tube to sideward pull open said spiral tube;

each of said transmission mechanisms being fixedly mounted on the exterior wall behind each of said rectangular frames, and including a motor that could be actuated to rotate a double-grooved steel wheel and thereby causes said craw hooks to release said rings of said rectangular frames normally caught by said claw hooks, allowing each of said tube-supporting frames to tilt down to a horizontal position and pull said spiral tube open; and each of said protection doors being closed when said tube-supporting frames are lifted to a standby position closely attached to said exterior wall, so that said tube-supporting frames are shielded by said protection doors; and said tube-supporting frames and said spiral-tube units connected thereto being normally lifted to flatly attach to the exterior wall of the building in front of said fixed exits when said collapsible spiral-tube escape way is not in use, and opening of said fixed doors automatically enabling said protection doors to be quickly opened, said claw hooks to release said rings, and said tube-supporting frames to tilt down by 90 degrees to a horizontal position to pull open said spiral-tube units for use in an emergency.

6. The collapsible spiral-tube escape way as claimed in claim 5, wherein each of said rectangular frames has steel reinforcements welded to two lower rear corners thereof.

7. The collapsible spiral-tube escape way as claimed in claim 5, wherein each of said tube-supporting frames in the standby position is slightly tilting outward and each of said rectangular frames includes a radially inward curved rear end, so that a space is provided between each of said tube-supporting frames and said exterior wall to avoid interference with said transmission mechanisms fixedly mounted on said exterior wall.

* * * * *